US010959153B2

(12) United States Patent
Patil et al.

(10) Patent No.: US 10,959,153 B2
(45) Date of Patent: Mar. 23, 2021

(54) TECHNIQUES FOR MULTI-LINK AGGREGATION SIGNALING

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Yan Zhou, San Diego, CA (US); Venkata Ramanan Venkatachalam Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/111,960

(22) Filed: Aug. 24, 2018

(65) Prior Publication Data

US 2019/0082373 A1 Mar. 14, 2019

Related U.S. Application Data

(60) Provisional application No. 62/556,984, filed on Sep. 11, 2017.

(51) Int. Cl.
*H04W 40/04* (2009.01)
*H04L 1/16* (2006.01)
(Continued)

(52) U.S. Cl.
CPC ........... *H04W 40/04* (2013.01); *H04L 1/1614* (2013.01); *H04W 40/244* (2013.01); *H04W 76/15* (2018.02)

(58) Field of Classification Search
CPC ... H04W 40/244; H04W 40/04; H04W 76/15; H04W 72/00; H04L 1/1614
See application file for complete search history.

(56) References Cited

U.S. PATENT DOCUMENTS 10,312,697 B1 * 6/2019 Stieber ................. H02J 7/0013
2013/0156005 A1 6/2013 Li et al.
(Continued)

OTHER PUBLICATIONS

International Search Report and Written Opinion—PCT/US2018/048078—ISA/EPO—dated Nov. 16, 2018.

*Primary Examiner* — Mandish K Randhawa
(74) *Attorney, Agent, or Firm* — Kevin T. Cheatham; Qualcomm Incorporated

(57) ABSTRACT

Methods, systems, and devices for wireless communication are described. A wireless device may identify a multi-link aggregation capability (e.g., a capability to transmit in parallel over multiple wireless links), and may transmit an indication of such capability to another wireless device. The indication may be included in an information element (e.g., a multi-band element) of a transmission frame. For example, the indication may be included in a multi-band element of a beacon, of association signaling, of probe signaling, of an add block acknowledgement (ADDBA) request, etc. The indication sent over one of the wireless links may include information for some or all the multiple links supported for multi-link aggregation. This information may include media access control (MAC) address, channel information, operating class, security information, etc. for each link. Such multi-link aggregation information may be used, for example, for establishment of improved block acknowledgment (BA) sessions between wireless devices.

29 Claims, 15 Drawing Sheets

(51) Int. Cl.
*H04W 76/15* (2018.01)
*H04W 40/24* (2009.01)

(56) References Cited

U.S. PATENT DOCUMENTS

| | | |
|---|---|---|
| 2013/0329600 A1 | 12/2013 | Vedula et al. |
| 2014/0133415 A1 | 5/2014 | Damnjanovic et al. |
| 2018/0054847 A1* | 2/2018 | Cariou .................. H04W 76/15 |
| 2018/0184233 A1* | 6/2018 | Alpert .................. H04L 5/0055 |

* cited by examiner

TECHNIQUES FOR MULTI-LINK AGGREGATION SIGNALING

CROSS REFERENCES

The present Application for Patent claims the benefit of U.S. Provisional Patent Application No. 62/556,984 by PATIL et al., entitled "TECHNIQUES FOR MULTI-LINK AGGREGATION SIGNALING," filed Sep. 11, 2017, assigned to the assignee hereof, and expressly incorporated herein.

BACKGROUND

The following relates generally to wireless communication, and more specifically to techniques for multi-link aggregation signaling.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

Some wireless communications systems may support multi-link aggregation, where transmissions may be transmitted and/or received over two or more links between any two wireless devices (e.g., AP and STA). In some cases, a transmitting device (e.g., that may receive acknowledgments from a receiving device) may be unaware of a multi-link aggregation scheme used by the receiving device. This may result in transmission latency (e.g., due to inefficient acknowledgment procedures) and reduced system performance. Improved signaling in wireless communications systems supporting multi-link operation may thus be desired.

SUMMARY

The described techniques relate to improved methods, systems, devices, or apparatuses that support techniques for multi-link aggregation signaling. Generally, the described techniques provide for multi-link signaling and establishment. A wireless device may identify a multi-link aggregation capability (e.g., a capability of the wireless device to transmit over multiple wireless links) and may transmit an indication of such capability to another wireless device. The multiple links may support parallel transmissions, including data exchange. In some cases, the links may support simultaneous (e.g., synchronized) transmissions. Alternatively, parallel transmissions over the links may not be synchronized, or be asynchronous. In some examples, there may be small delays or time offsets to account for control signaling or other implementation-based constraints and/or each link may operate independently. The multi-link capability indication may be included in an information element (e.g., a multi-band element) of a frame. For example, the indication may be included in a multi-band element of a beacon, association signaling, probe signaling, an add block acknowledgement (ADDBA) request or response, etc. The indication of the capability sent over one of the wireless links may include information for some or all the links supported in multi-link aggregation. For example, fields or information bits in the information element may be repeated for each of the multiple links to convey information for each respective link. The information element may include media access control (MAC) address, channel information, operating class, security information, etc., for each link.

Such multi-link aggregation signaling may be used, for example, to establish improved block acknowledgment (BA) sessions between wireless devices. For example, the wireless device may establish a BA session (e.g., based on the multi-link capabilities indication) over the multiple links supported by the wireless device for multi-link aggregation. In some cases, the BA session may be established based on an ADDBA frame (e.g., used to indicate the multi-link capabilities). The BA session may use transmitter address (TA), receiver address (RA), and/or traffic identifier (TID) information from the ADDBA frame for the indicated links. The wireless device may then transmit packets to another wireless device using multiple links and receive a BA with acknowledgement information accounting for the transmitted packets according to the established BA session. The BA session may use one, or multiple, of the links to transmit BAs in response to the transmitted packets. For example, a BA session may be established on each link independently, where a BA session established on each link accounts for packets transmitted on the respective link. In other examples, a single BA session may be established that accounts for packets transmitted across the multiple links, where the BAs may be transmitted on a single link or may be transmitted across any of the multiple links (e.g., depending on how the BA session is established).

A method of wireless communication is described. The method may include identifying, by a first wireless device, a capability of the first wireless device to transmit in parallel over a plurality of wireless links between the second wireless device and the first wireless device during at least a first duration of a multi-link session, the plurality of wireless links including at least a first wireless link and a second wireless link and transmitting an indication of the capability.

An apparatus for wireless communication is described. The apparatus may include means for identifying, by a first wireless device, a capability of the first wireless device to transmit in parallel over a plurality of wireless links between the second wireless device and the first wireless device during at least a first duration of a multi-link session, the plurality of wireless links including at least a first wireless link and a second wireless link and means for transmitting an indication of the capability.

Another apparatus for wireless communication is described. The apparatus may include a processor, memory in electronic communication with the processor, and instructions stored in the memory. The instructions may be operable to cause the processor to identify, by a first wireless device, a capability of the first wireless device to transmit in parallel over a plurality of wireless links between the second wireless device and the first wireless device during at least a first duration of a multi-link session, the plurality of wireless links including at least a first wireless link and a second wireless link and transmit an indication of the capability.

A non-transitory computer readable medium for wireless communication is described. The non-transitory computer-readable medium may include instructions operable to cause a processor to identify, by a first wireless device, a capability of the first wireless device to transmit in parallel over a plurality of wireless links between the second wireless device and the first wireless device during at least a first duration of a multi-link session, the plurality of wireless links including at least a first wireless link and a second wireless link and transmit an indication of the capability.

Some examples of the method, apparatus, and non-transitory computer-readable medium described above may further include processes, features, means, or instructions for establishing the multi-link session between the first wireless device and the second wireless device based at least in part on the indication of the capability.

Some examples of the method, apparatus, and non-transitory computer-readable medium described above may further include processes, features, means, or instructions for identifying a number of the plurality of wireless links. Some examples of the method, apparatus, and non-transitory computer-readable medium described above may further include processes, features, means, or instructions for transmitting an indication of the number of the plurality of wireless links.

In some examples of the method, apparatus, and non-transitory computer-readable medium described above, transmitting the indication of the capability comprises: transmitting link information for the first wireless link in a first portion of an information element. Some examples of the method, apparatus, and non-transitory computer-readable medium described above may further include processes, features, means, or instructions for transmitting link information for the second wireless link in a second portion of the information element. In some examples of the method, apparatus, and non-transitory computer-readable medium described above, the link information for the first wireless link comprises a first MAC address, channel information, an operating class, security information, or a combination thereof, for the first wireless link. In some examples of the method, apparatus, and non-transitory computer-readable medium described above, the link information for the second wireless link comprises a second MAC address, channel information, an operating class, security information, or a combination thereof, for the second wireless link.

In some examples of the method, apparatus, and non-transitory computer-readable medium described above, transmitting the indication of the capability comprises transmitting link information for the first wireless link, the link information comprising a first MAC address, channel information, an operating class, security information, or a combination thereof, for the first wireless link, and transmitting link information for the second wireless link, the link information comprising a second MAC address, channel information, an operating class, security information, or a combination thereof, for the second wireless link.

In some examples of the method, apparatus, and non-transitory computer-readable medium described above, transmitting the indication of the capability comprises transmitting the indication of the capability in an element of a frame. In some examples of the method, apparatus, and non-transitory computer-readable medium described above, the element comprises a multi-band element. In some examples of the method, apparatus, and non-transitory computer-readable medium described above, the element of the frame comprises a multi-band element comprising one or both of a multi-band control field or a multi-band connection capability field, the indication of the capability transmitted in the multi-band control field or the multi-band connection capability field.

In some examples of the method, apparatus, and non-transitory computer-readable medium described above, transmitting the indication of the capability in the multi-band element of the frame comprises: transmitting the indication of the capability in a beacon, or an association request, or an association response, or a reassociation request, or a reassociation response, or a probe request, or a probe response, or an ADDBA request, or an ADDBA response, or a combination thereof.

In some examples of the method, apparatus, and non-transitory computer-readable medium described above, the element of the frame comprises an optional sub-element of a multi-band element, the indication of the capability transmitted in the optional sub-element. Some examples of the method, apparatus, and non-transitory computer-readable medium described above may further include processes, features, means, or instructions for establishing a first BA session between the first wireless device and the second wireless device, the first BA session for transmission of BAs responsive to transmissions on the first wireless link, and processes, features, means, or instructions for establishing a second BA session between the first wireless device and the second wireless device, the second BA session for transmission of BAs responsive to transmissions on the second wireless link.

Some examples of the method, apparatus, and non-transitory computer-readable medium described above may further include processes, features, means, or instructions for establishing a BA session between the first wireless device and the second wireless device, the BA session for transmission of BAs responsive to transmissions over the first wireless link and the second wireless link.

Some examples of the method, apparatus, and non-transitory computer-readable medium described above may further include processes, features, means, or instructions for exchanging an ADDBA frame, wherein the ADDBA frame may be used to establish the BA session on one of the first wireless link or the second wireless link, the one of the first wireless link or the second wireless link used to transmit block acknowledgment requests (BARs) and BAs in response to the BARs.

Some examples of the method, apparatus, and non-transitory computer-readable medium described above may further include processes, features, means, or instructions for transmitting an indication that the BA session uses the first wireless link, or the second wireless link, or a combination thereof, to provide to transmit the BAs.

In some examples of the method, apparatus, and non-transitory computer-readable medium described above, the indication that the BA session uses the first wireless link, or the second wireless link, or a combination thereof, comprises a TA, a RA, and a TID for the first wireless link, or a TA, a RA, and a TID for the second wireless link, or a combination thereof.

Some examples of the method, apparatus, and non-transitory computer-readable medium described above may further include processes, features, means, or instructions for transmitting a plurality of packets to the second wireless device, a first set of the plurality of packets transmitted over the first wireless link during a same time duration as a second set of the plurality of packets transmitted over the second wireless link. Some examples of the method, apparatus, and non-transitory computer-readable medium described above may further include processes, features, means, or instructions for receiving, from the second wireless device, a BA responsive to the first set and the second set.

Some examples of the method, apparatus, and non-transitory computer-readable medium described above may further include processes, features, means, or instructions for receiving a plurality of packets from the second wireless device, a first set of the plurality of packets transmitted over the first wireless link during a same time duration as a second set of the plurality of packets transmitted over the second wireless link. Some examples of the method, apparatus, and non-transitory computer-readable medium described above may further include processes, features, means, or instructions for transmitting, to the second wireless device, a BA responsive to the first set and the second set.

Some examples of the method, apparatus, and non-transitory computer-readable medium described above may further include processes, features, means, or instructions for receiving a plurality of packets from the second wireless device, a first set of the plurality of packets transmitted over the first wireless link during a same time duration as a second set of the plurality of packets transmitted over the second wireless link, transmitting, to the second wireless device, a first BA responsive to the first set, and transmitting, to the second wireless device, a second BA responsive to the second set.

Some examples of the method, apparatus, and non-transitory computer-readable medium described above may further include processes, features, means, or instructions for receiving, from the second wireless device, an indication of a capability of the second wireless device to aggregate a second plurality of wireless links, the second plurality of wireless links including at least the first wireless link and the second wireless link, wherein: establishing the first wireless link and the second wireless link may be based at least in part on the capability of the first wireless device and the received indication of the capability of the second wireless device.

In some examples of the method, apparatus, and non-transitory computer-readable medium described above, the first wireless link comprises a first wireless channel in a first radio frequency (RF) spectrum band. In some examples of the method, apparatus, and non-transitory computer-readable medium described above, the second wireless link comprises a second wireless channel in the first RF spectrum band or a second RF spectrum band. Some examples of the method, apparatus, and non-transitory computer-readable medium described above may further include processes, features, means, or instructions for transmitting the indication of the capability using the first wireless link in the first RF spectrum band, where the indication of the capability indicates that the second wireless link comprises the wireless channel in the second RF frequency band. Some examples of the method, apparatus, and non-transitory computer-readable medium described above may further include processes, features, means, or instructions for performing a session transfer from the first wireless link to the second wireless after the indication of the capability is transmitted. In some examples of the method, apparatus, and non-transitory computer-readable medium described above, the first wireless channel comprises a channel in a 2.4 GHz band or a channel in a 5 GHz band, and the second wireless channel comprises a channel in a 6 GHz band.

A method of wireless communication is described. The method may include receiving, by a first wireless device, an indication of a capability of a second wireless device to transmit in parallel over a plurality of wireless links between the second wireless device and the first wireless device during at least a first duration of a multi-link session, identifying a first wireless link and a second wireless link of the plurality of wireless links based at least in part on the received indication of the capability, and establishing, for the multi-link session, the first wireless link and the second wireless link between the first wireless device and the second wireless device based at least in part on the identification.

An apparatus for wireless communication is described. The apparatus may include means for receiving, by a first wireless device, an indication of a capability of a second wireless device to transmit in parallel over a plurality of wireless links between the second wireless device and the first wireless device during at least a first duration of a multi-link session, means for identifying a first wireless link and a second wireless link of the plurality of wireless links based at least in part on the received indication of the capability, and means for establishing, for the multi-link session, the first wireless link and the second wireless link between the first wireless device and the second wireless device based at least in part on the identification.

Another apparatus for wireless communication is described. The apparatus may include a processor, memory in electronic communication with the processor, and instructions stored in the memory. The instructions may be operable to cause the processor to receive, by a first wireless device, an indication of a capability of a second wireless device to transmit in parallel over a plurality of wireless links between the second wireless device and the first wireless device during at least a first duration of a multi-link session, identify a first wireless link and a second wireless link of the plurality of wireless links based at least in part on the received indication of the capability, and establish, for the multi-link session, the first wireless link and the second wireless link between the first wireless device and the second wireless device based at least in part on the identification.

A non-transitory computer readable medium for wireless communication is described. The non-transitory computer-readable medium may include instructions operable to cause a processor to receive, by a first wireless device, an indication of a capability of a second wireless device to transmit in parallel over a plurality of wireless links between the second wireless device and the first wireless device during at least a first duration of a multi-link session, identify a first wireless link and a second wireless link of the plurality of wireless links based at least in part on the received indication of the capability, and establish, for the multi-link session, the first wireless link and the second wireless link between the first wireless device and the second wireless device based at least in part on the identification.

DETAILED DESCRIPTION

Figure 1:
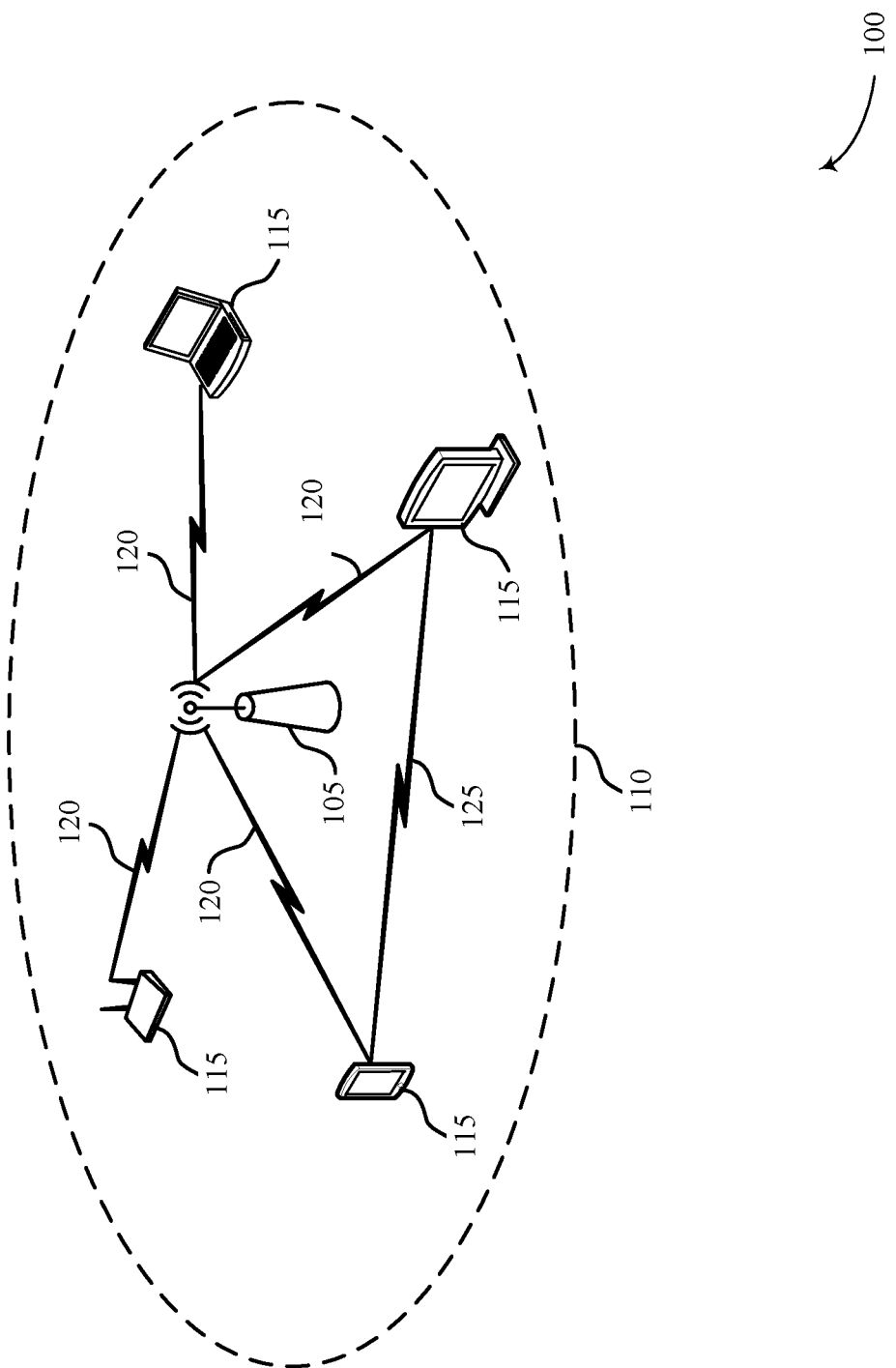
FIG. 1 illustrates an example of a system for wireless communication that supports techniques for multi-link aggregation signaling in accordance with aspects of the present disclosure.

Some wireless communications systems may support multiple parallel links between communicating devices (e.g., to increase throughput). A wireless link may refer to a communication path between devices, and each link may support one or more channels or logical entities that support multiplexing of data, such that during at least some duration of time, transmissions or portions of transmissions may occur over both links at the same time, either synchronously, or asynchronously. In some cases (e.g., for single link operation) each link may be associated with a unique transmitter address (TA) and a unique receiver (RA). For acknowledgment procedures in such cases, a TA, RA, and traffic identifier (TID) tuple (e.g., <TA, RA, TID>) may correspond to a block acknowledgement (BA) session on that particular link. That is, a BA session may be set up or established on a per TID basis. An add BA (ADDBA) frame may be per<RA, TA>and per TID (e.g., per access category). However, in wireless communications systems supporting multi-link operation (e.g., wireless local area network (WLAN) 200), each TID may be aggregated across multiple links. Therefore, if each aggregated TID is associated with a common BA session across multiple links, predefined mapping between<TA, RA, TID>and the BA session will be violated (e.g., in cases where each link keeps a unique<TA, RA>).

Therefore, wireless communications systems may support signaling indicative of multi-link operation or capability. For example, such signaling may enable a BA session over the multiple links. Each link may have a different address and signaling may be implemented to indicate a BA session may apply to multiple different links. For example, such signaling may indicate the addresses of the different links that are associated with a BA session, such that a BA session may be unambiguously applied in multi-link operation scenarios. According to examples described herein, an element of an acknowledgement request frame (e.g., a BA request (BAR) frame, an ADDBA frame, etc.) may be used to indicate such information. In some examples, an element of a frame (e.g., a multi-band element) may be extended to indicate the BA session is for multi-link aggregation and may indicate the different addresses that apply to the BA session. Such an element may also be included in other types of frames, including a beacon, an association request or response, a reassociation request or response, a probe request or response, or an ADDBA request or response. The element may be a multi-band element and may carry such signaling and may further include the signaling in a multi-band control field or a multi-band connection capability field of the multi-band element. For example, in some cases, the multi-band element may comprise an optional sub-element. In such cases, the optional sub-element may include the signaling indicative of multi-link operation or capability.

Aspects of the disclosure are initially described in the context of a wireless communications system. Example frame elements and process flows for multi-link aggregation signaling are then discussed. Aspects of the disclosure are further illustrated by and described with reference to apparatus diagrams, system diagrams, and flowcharts that relate to techniques for multi-link aggregation signaling.

FIG. 1 illustrates a WLAN 100 (also known as a Wi-Fi network) configured in accordance with various aspects of the present disclosure. The WLAN 100 may include an access point (AP) 105 and multiple associated stations (STAs) 115, which may represent devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11az, 802.11ba, etc. In other implementations, peer-to-peer connections or ad hoc networks may be implemented within WLAN 100. Devices in WLAN 100 may communicate over unlicensed spectrum, which may be a portion of spectrum that includes frequency bands traditionally used by Wi-Fi technology, such as the 5 GHz band, the 2.4 GHz band, the 6 GHz band, the 60 GHz band, the 3.6 GHz band, and/or the 900 MHz band. The unlicensed spectrum may also include other frequency bands.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., carrier-sense multiple access (CSMA)/carrier aggregation (CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In a system supporting multi-link aggregation (which may also be referred to as multichannel aggregation), some of the traffic associated with a single STA 115, e.g., the first STA 115, may be transmitted on both channels (e.g., using the unused resources of the second channel). Multi-link aggregation may thus provide a means to increase network capacity and maximize the utilization of available resources.

Multi-link aggregation may be implemented in a number of ways. As a first example, the multi-link aggregation may be referred to as packet-based. In packet-based aggregation, frames of a single traffic flow (e.g., all traffic associated with a given TID) may be sent concurrently across multiple radio links, on multiple channels. In some cases, the multiple channels may be in the same radio frequency (RF) band (e.g., a 5 GHz band). In other cases, the multiple links may be in different bands (e.g., one may lie in the 2.4 GHz band while another is in the 5 GHz band or the 6 GHz band). Each link may be associated with a different physical layer (PHY) and lower MAC layer. In such an implementation, management of the aggregation of the separate links may be performed at a higher MAC layer. The multilink aggregation may be transparent to the upper layers of the wireless device.

As another example, the multi-link aggregation may be referred to as flow-based. In flow-based aggregation, each traffic flow (e.g., all traffic associated with a given TID) may be sent using one of multiple available radio links. As an example, a single STA 115 may access a web browser while streaming a video, e.g., in parallel. The traffic associated with the web browser access may be communicated over a first channel of the first link while the traffic associated with the video stream may be communicated over a second channel of the second link in parallel (e.g., at least some of the data may be transmitted on the first channel concurrent with data transmitted on the second channel). As described above, the channels and links may belong to the same RF band or to different RF bands. In the case of more than two links (e.g., three links), all three may belong to the same RF band, two but not the third may belong to the same RF band, each link may belong to a separate RF band, etc. In some cases, flow-based aggregation may not use cross-link packet scheduling and reordering (e.g., which may be used to support packet-based aggregation). Alternatively, in the case of a single flow (e.g., in the case that the STA 115 simply attempts to access a web browser), aggregation gain may not be available.

In other embodiments, a hybrid of flow-based and packet-based aggregation may be employed. As an example, a device may employ flow-based aggregation in situations in which multiple traffic flows are created and may employ packet-based aggregation in other situations. The decision to switch between multi-link aggregation techniques may additionally or alternatively be based on other metrics (e.g., a time of day, traffic load within the network, battery power for a wireless device, etc.).

In order to support the described multi-link aggregation techniques, APs 105 and STAs 115 may exchange supported aggregation capability information (e.g. supported aggregation type, supported frequency bands, etc.). In some cases, the exchange of information may occur via a beacon signal, a probe association request or a probe association response, dedicated action frames, etc. In some cases, an AP 105 may designate a given link in a given band as an anchor link (e.g., the link on which it transmits beacons and other management frames). In this case, the AP 105 may transmit beacons (e.g., which may contain less information) on other links for discovery purposes. Although described as being frequency-based, the anchor link could additionally or alternatively refer to a point in time (e.g., an AP 105 may transmit its beacon at a certain time on one or more channels). The anchor link scheme can apply to packet-based aggregation and/or flow-based aggregation.

In some examples, in multi-link aggregation, each link may use its own transmit queue. In other examples, a common transmit queue may be used. In some examples, each link may have a unique TA and RA. In other examples, the TA and RA may be common across the multiple links used for multi-link aggregation. In other examples, one or more of a sequence number (SN), frame number (FN), and/or packet number (PN) may be common across the communication links. Other items that may be common across links include encryption keys, MAC packet data unit (MPDU) generation and/or encryption, aggregated MAC service data unit (AMSDU) constraints, fragment size, and reordering, replay check, and/or de-fragmentation techniques. In other examples, as described below, encryption keys may be per-link.

In some examples, multi-link aggregation may use multiple sequence numbers. In other examples, aggregation may be performed over non-co-located APs. In some examples, power may be saved by idling unused channels or links of the multi-link aggregation scheme. A STA 115 may then monitor a non-idled link (e.g., an anchor link) reserved for receiving information regarding data to be received on the various links.

In various examples, BAs may be sent in response to multi-link transmissions. For example, a BA session may refer to sending an acknowledgment (ACK) for multiple MPDUs sent together (e.g., an ACK for a block of MPDUs). Both the transmitting device (e.g., the device requesting the BA) and the receiving device (e.g., the device transmitting the BA) may maintain a sliding window (e.g., a BA window), and may have previously negotiated the size of the BA. For example, a BA session may have a BA size of 64 MPDUs (e.g., other BA size examples may include 256 MPDUs, 1024 MPDUs, etc.). In such cases, a transmitting device may transmit 64 MPDUs followed by a BAR. In response to the BAR, the receiving device may, upon reception of the 64 MPDUs and the BAR, transmit a BA to the transmitting device. The BA may indicate whether all 64 MPDUs were received correctly, which MPDUs are missing, etc. In some cases, a BA may be used to indicate the longer BA window, or a capability exchange or agreement defining the larger BA window may also be sent. In other examples, a single SN may be used, but with multiple scorecards (e.g., one per channel or link), or with a global as well as per-link scorecards. Multi-link aggregation (e.g., flow-based and/or packet-based) may increase network capacity by efficiently allocating utilization of multiple links (and multiple channels).

Although certain techniques for multi-link aggregation described herein may be described in certain combinations or contexts, combinations of different techniques or portions of different techniques may be applied in other combinations and contexts. For example, information conveyed via certain fields in information elements as described below may in some cases be conveyed in other fields of an information element. Further, techniques for multi-link capability signaling described in the context of acknowledgment procedures may be extended to other contexts, such as for resource allocation/scheduling, etc.

Figure 2:
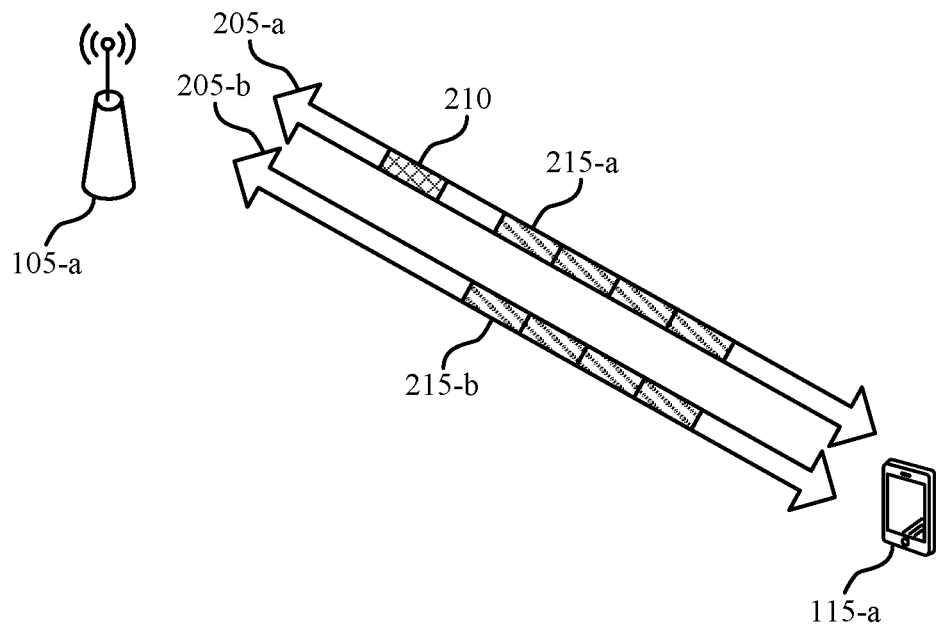
FIG. 2 illustrates an example of a wireless communications system that supports techniques for multi-link aggregation signaling in accordance with aspects of the present disclosure.

FIG. 2 illustrates an example of a WLAN 200 that supports techniques for multi-link aggregation signaling in accordance with various aspects of the present disclosure. In some examples, WLAN 200 may implement aspects of WLAN 100. A wireless connection between AP 105-a and STA 115-a may be referred to as a link 205, and each link may include one or more channels. As an example, WLAN 200 may support multi-link aggregation such that AP 105-a and STA 115-a may communicate in parallel over two or more links (e.g., link 205-a and link 205-b). In some cases, the parallel wireless links may support simultaneous (e.g., synchronized) transmissions. In some cases or during certain time durations, transmissions over the links may be in parallel, but not be synchronized or simultaneous. During at least some durations, two or more of the links may be used for communications between the wireless devices, either in the same direction (e.g., all uplink, all downlink, etc.) or in different directions (e.g., some uplink and some downlink). STA 115-a may thus receive packets (e.g., MPDUs) over both link 205-a and link 205-b, from AP 105-a. Such parallel communications over the two or more links may be synchronized (e.g., simultaneous) or unsynchronized (e.g., asynchronous), and may be uplink, or downlink, or a combination of uplink and downlink during a particular duration of time. In some cases (e.g., for single link operation) each link 205 may be associated with a unique TA and a unique RA. For acknowledgement procedures in such cases, a TA, RA, and TID tuple (e.g., <TA, RA, TID>) may correspond to a BA session on that particular link 205 (e.g., link 205-a and link 205-b may each have a unique TA, RA, TID tuple).

As an example, an AP 105-a may transmit a capability indication 210 (e.g., an ADDBA frame, a BAR, etc.) that may indicate multi-link capabilities to STA 115-a. Based on the capability indication 210, the AP 105-a and the STA 115-a may establish a multi-link session and/or a BA session. For example, the STA 115-a may receive multiple packets from AP 105-a via multiple links 205 (e.g., STA 115-a may receive packet 215-a on link 205-a while receiving packet 215-b on link 205-b in parallel). STA 115-a may respond (e.g., to the multiple packets) with a BA, which may take into account reception of the packets over both links. The BA may be sent on one of links 205-a or 205-b. In some examples, either link 205-a or link 205-b may be used to transmit BAs, but not both.

According to techniques described herein, WLAN 200 may support signaling indicative of multi-link operation or existence. As such, a BA session may be enabled over the multiple links. For example, link 205-a and link 205-b may each have a different address and signaling may be implemented to indicate a BA session may apply to both links (e.g., a BA session may be applied across both links). For example, AP 105-a and/or STA 115-a may transmit a BAR frame, an ADDBA frame, etc., to indicate the addresses (e.g., RA and TA) of both link 205-a and link 205-b, such that a BA session may be applied or performed across both links of STA 115-a. As such, AP 105-a and STA 115-a may engage in BA session that takes into account multi-link aggregation. As discussed in further detail below, an element of an acknowledgement request frame (e.g., a BAR frame, an ADDBA frame, etc.) may be used to indicate such information. In some examples, a multi-band element may be extended to indicate the BA session is for multi-link aggregation and may indicate the different addresses that apply to the BA session.

Figure 3:
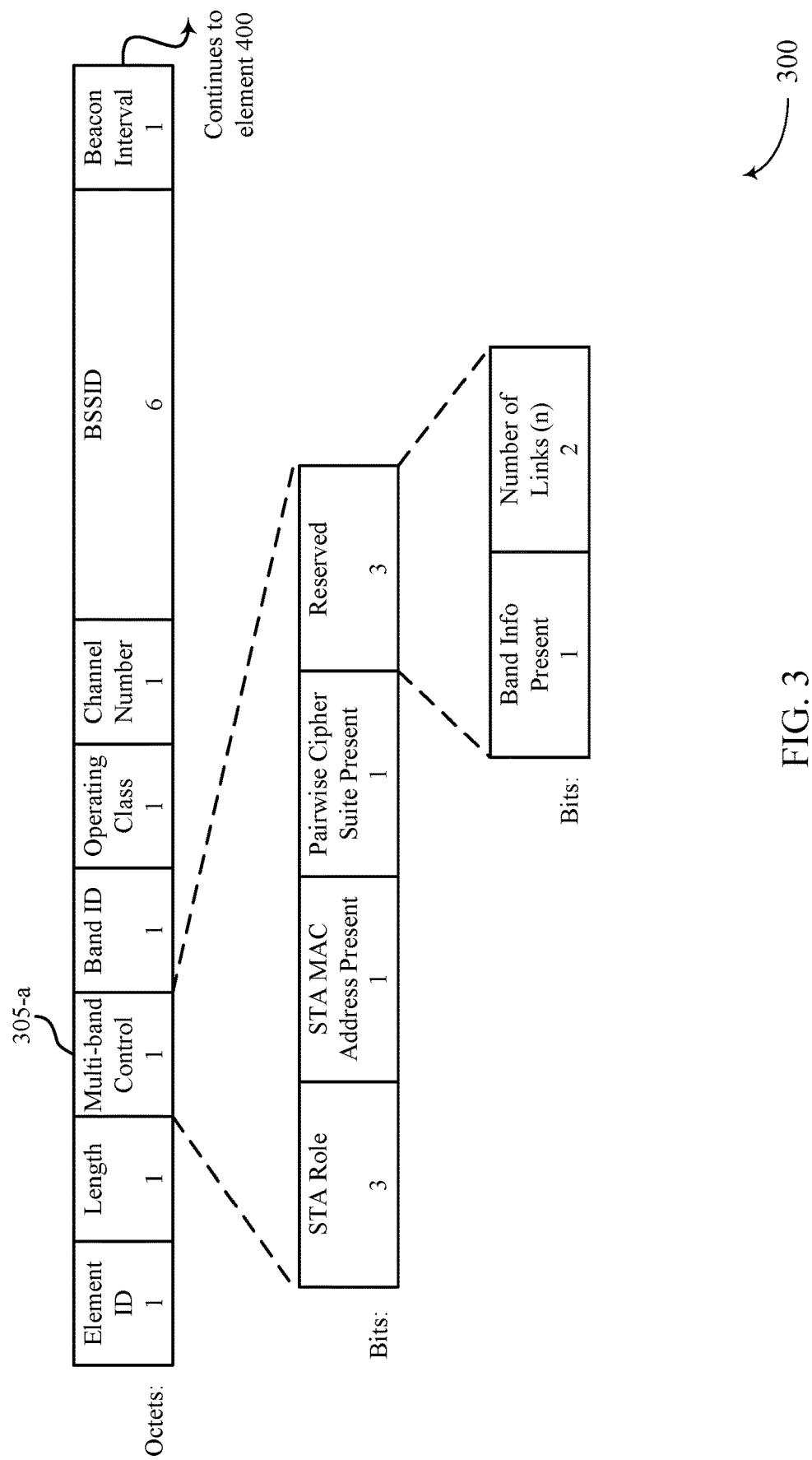
FIG. 3 illustrates an example of a frame element that supports techniques for multi-link aggregation signaling in accordance with aspects of the present disclosure.

FIG. 3 illustrates an example of an element 300 that supports techniques for multi-link aggregation signaling in accordance with various aspects of the present disclosure. In some examples, element 300 may implement aspects of WLAN 100. Element 300 may illustrate various fields which may be extended or modified to convey multi-link aggregation information (e.g., for BA session establishment). In some cases, element 300 may refer to an information element (e.g., a multi-band element), which may be conveyed via an ADDBA request or ADDBA response frame, a BAR, a beacon, a probe request or a probe response, an association request or an association response, or some other frame. In cases where element 300 illustrates a multi-band element present in an ADDBA request frame, the multi-band element (e.g., element 300) may indicate the frequency band, operating class, and channel number (e.g., link) to which the ADDBA request frame applies, and may contain band-specific information. The following Table may indicate ADDBA request frame action field format.

TABLE 1

| Order | Information |
|---|---|
| 1 | Category |
| 2 | Block ACK Action |
| 3 | Dialog Token |
| 4 | Block ACK Parameter Set |
| 5 | Block ACK Timeout Value |
| 6 | Block ACK Starting Sequence Control |
| 7 | Groupcast with Retries (GCR) Group Address element (optional) |
| 8 | Multi-band (optional) |
| 9 | Traffic Classification (TCLAS) (optional) |
| 10 | ADDBA Extension (optional) |

In some cases, element 300 may provide channel, operating class, and other information related to the devices capability or intention to operate on another band (e.g., element 300 may include STA MAC addresses, role (e.g., AP), security, etc.). The element 300 may indicate that the transmitting STA 115 is a multi-band device capable of operating in a frequency band or operating class or channel other than the one in which this element 300 is transmitted and that the transmitting STA is able to accomplish a session transfer from the current channel to a channel using another link in the same device, in the other or same band. For example, in some cases, element 300 may indicate that the transmitting STA 115 is capable of operating or establishing a channel in the 6 GHz band in addition to a channel in the 2.4 GHz band. The element 300 may be transmitted using a first link (e.g., a link or channel in the 2.4 or 5 GHz band), and may indicate STA 115 capabilities and/or operating parameters of the other link (e.g., for a link or channel that may be established in the 6 GHz band). The indicated capabilities and/or operating parameters transmitted using the first link (e.g., the link or channel in the 2.4 or 5 GHz band) may include, for example, supported aggregation type, supported frequency bands, supported channels, supported BA sessions, etc., for the other link (e.g., the link or channel in the 6 GHz band). In such cases, the STA 115 may be able to accomplish a session transfer from a current channel (e.g., in the 2.4 GHz band) to a channel using the other link (e.g., in the 6 GHz band). The multi-link session may thus support parallel communication over the two links or the multi-link session may support a session transfer from the current channel to the channel using the other link (e.g., in the 6 GHz band) while the link associated with the current channel (e.g., in the 2.4 GHz band) may be turned off.

According to techniques described herein, element 300 may be extended for signaling multi-link capability/operation. Such may be achieved by adding new fields (e.g., optional sub-elements) to indicate STA MAC information (e.g., addresses such as RA and TA) and other channel information corresponding to the other links, or by using one or more reserved bits (e.g., in the multi-band control field 305-a of element 300). Element 300 may include multiple fields. In the present example, a multi-band control field 305-a may convey information such as STA role, the presence of a STA MAC address, etc. As further described above, such element 300 may be transmitted using a first link in a first band (e.g., a 2.4 or 5 GHz band) to indicate capabilities and/or operating parameters of the other link in another band (e.g., a 6 GHz band).

Multi-band control field 305-a may further refer to an octet, where the bits convey such information. As illustrated, the multi-band control field 305-a may include 3 reserved bits, which may be extended to include a toggle bit indicating that band information is present, in addition to two bits indicating the number of links (e.g., up to four links indicated by two bits) present in the multi-link aggregation scheme.

In other examples, the bits indicating the STA role (e.g., the first 3 bits of the multi-band control field 405-a) may indicate the presence or capability of multi-link operation. The STA Role subfield (e.g., the 3 STA role bits) may specify the role the transmitting STA plays on the channel of the operating class indicated in this element. The possible values associated with bits of the STA Role subfield are indicated in the table below. As an example, if the STA Role subfield is set to independent basic service set (IBSS) STA, the basic service set identification (BSSID) subfield contains the BSSID of the IBSS. For example, the 3 bits indicating the STA role may take the values 0 through 7, which may indicate the following as provided by the following Table:

TABLE 2

| STA Role | Value |
| --- | --- |
| AP | 0 |
| TDLS STA | 1 |
| IBSS STA | 2 |
| Port Control Protocol (PCP) | 3 |
| Non-PCP and Non-AP STA | 4 |
| Multi-Link | 5 |
| Reserved | 6-7 |

In some cases, a link may be referred to as a STA. In such cases, a wireless device capable of multi-link aggregation may be referred to as having multiple STAs (e.g., a multi-link capable device may receive transmissions across multiple STAs or links). Such terminology may not generally be adopted in the present specification, however in the following discussion, information discussed as relevant to a STA may correspond to either the mobile device or a link of the mobile device. In some cases, a STA may perform in more than one role in a channel, and the STA Role subfield may identify the role that is most relevant for the STA for that channel. The STA MAC Address Present subfield may indicate whether the STA MAC Address subfield is present in the Multi-band element. If the present subfield is set to 1, the STA MAC Address subfield is present. If the STA MAC Address Present subfield is set to 0, the STA MAC Address subfield is not present. The Pairwise Cipher Suite Present subfield may indicate whether the Pairwise Cipher Suite Count field and the Pairwise Cipher Suite List field are present in the Multi-band element. If the Pairwise Cipher Suite Present subfield is set to 1, the Pairwise Cipher Suite Count field and the Pairwise Cipher Suite List field are present. If the Pairwise Cipher Suite Present subfield is set to 0, the Pairwise Cipher Suite Count field and the Pairwise Cipher Suite List field are not present. The Band ID field may provide identification of the frequency band related to the Operating Class and Channel Number fields. Operating Class field may indicate the channel set for which the Multi-band element applies. Operating Class and Channel Number together may specify the channel frequency and spacing for which the Multi-band element applies. This field is set to 0 to indicate all operating classes within the frequency band specified by the value of the Band ID field. The Channel Number field may be set to the number of the channel the transmitting STA is operating on or intends to operate on. This field may be set to 0 to indicate all channels within the frequency band specified by the value of the Band ID field. The BSSID field may specify the BSSID of the BSS operating on the channel and frequency band indicated by the Channel Number and Band ID fields. The Beacon Interval field may specify the size of the beacon interval for the BSS operating on the channel and frequency band indicated by the Channel Number and Band ID fields. This field may be set to 0 if no BSS is in operation in the indicated channel and frequency band.

Figure 4:
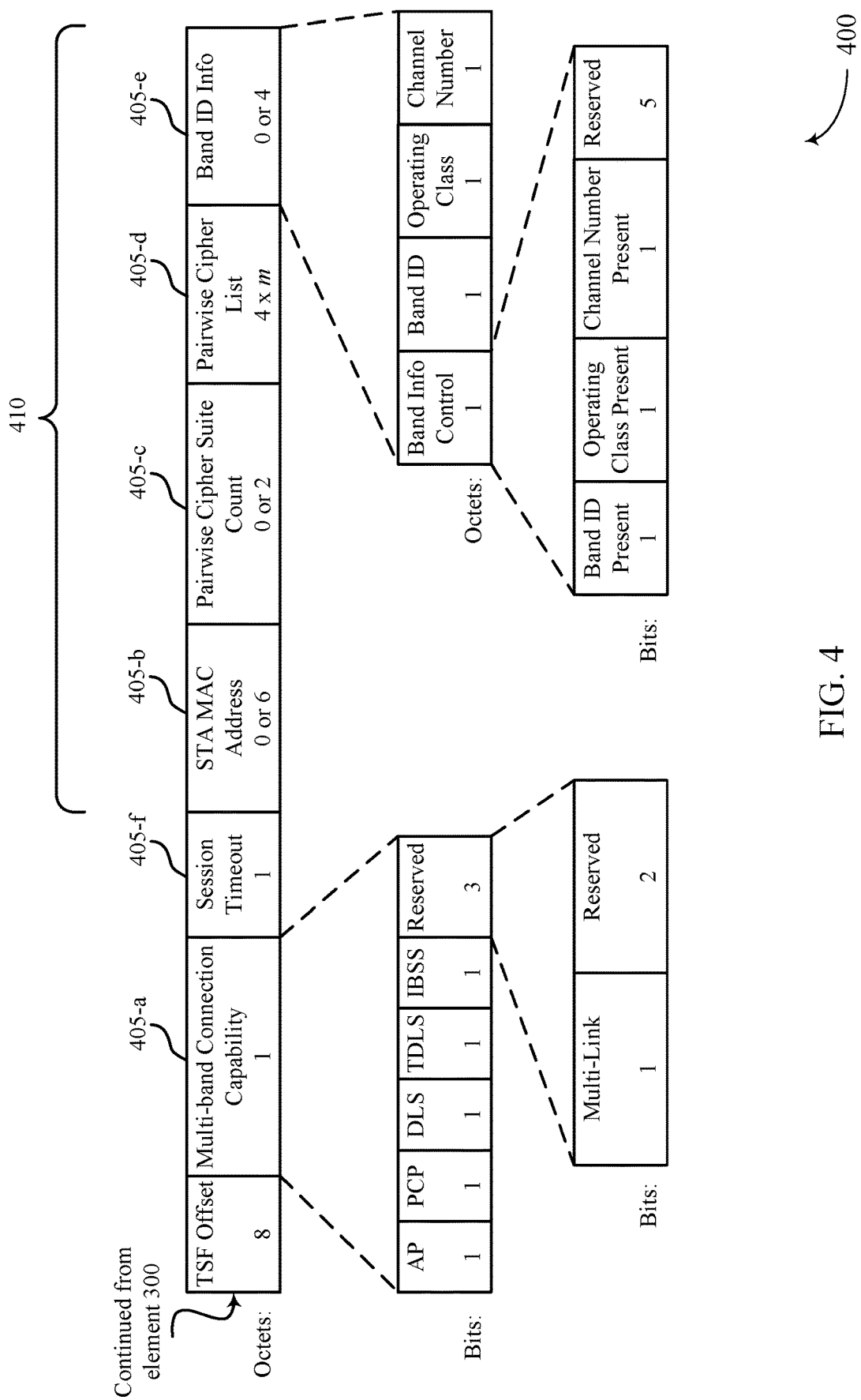
FIG. 4 illustrates an example of a frame element that supports techniques for multi-link aggregation signaling in accordance with aspects of the present disclosure.

FIG. 4 illustrates an example of an element 400 that supports techniques for multi-link aggregation signaling in accordance with various aspects of the present disclosure. In some examples, element 400 may implement aspects of WLAN 100. Element 400 may illustrate various fields which may be extended or modified to convey multi-link aggregation information (e.g., for BA session establishment). In some cases, element 400 may refer to a multi-band element, which may be conveyed via an ADDBA request frame or an ADDBA response frame, a BAR, a beacon, a probe request or a probe response, an association request or an association response, or some other frame. In some cases, element 400 may refer to the remaining fields of element 300 (e.g., with reference to FIG. 3). That is, element 300 and element 400 may be the first and second portions, respectively, of the same element (e.g., element 400 may be a continuation or the remainder of element 300), which may refer to a multi-band element, which may be conveyed via an ADDBA request frame or an ADDBA response frame, a BAR, a beacon, a probe request or a probe response, an association request or an association response, or some other frame.

If the transmitting STA is a member of a personal basic service set (PBSS) or infrastructure BSS on both the channel indicated in this element and the channel on which the element is transmitted, then the timing synchronization function (TSF) Offset field contains the time offset of the TSF of the PBSS or infrastructure BSS of which the transmitting STA is member on the channel indicated in this element relative to the TSF of the PBSS or infrastructure BSS corresponding to the BSSID indicated in the Address 3 field of the MPDU in which this element is transmitted. The value of the TSF Offset field is specified as a 2 s complement integer in microsecond units. If the transmitting STA is not a member of an infrastructure BSS or PBSS on both the channel indicated in this element and the channel on which the element is transmitted, then the TSF Offset field contains the value 0.

The Multi-band Connection Capability field may indicate the connection capabilities supported by the STA on the channel and band indicated in this element. The AP subfield specifies whether the STA can function as an AP on the channel and band indicated in the element. It is set to 1 when the STA is capable to function as an AP, and it is set to 0 otherwise. The PCP subfield may specify whether the STA can function as a PCP on the channel and band indicated in the element. It may be set to 1 when the STA is capable to function as a PCP, and it may be set to 0 otherwise. The DLS subfield may be set to 1 to indicate that the STA can perform a DLS on the channel and band indicated in the element. Otherwise, it is set to 0. The TDLS subfield may be set to 1 to indicate that the STA can perform a TDLS on the channel and band indicated in the element. Otherwise, the TDLS subfield may be set to 0. The IBSS subfield may be set to 1 to indicate that the STA is able to support IBSS on the channel and band indicated in the element. Otherwise, the IBSS subfield may be set to 0. The FSTSessionTimeout field 405-*f* may provide information on the band/channel of the other links. The FSTSessionTimeout field 405-*f* is used in the fast session timeout (FST) Setup Request frame to indicate the timeout value for FST session setup protocol. The FSTSessionTimeout field 405-*f* contains the duration, in TUs, after which the FST setup is terminated. The STA MAC Address field 405-*b* may contain the MAC address that the transmitting STA uses while operating on the channel indicated in this element. The STA MAC Address field 405-*b* may not be present in this element if the STA MAC Address Present field is set to 0. The Pairwise Cipher Suite Count field 405-*c* and the Pairwise Cipher Suite List field 405-*d* may not be present in this element 400 if the Pairwise Cipher Suite Present subfield is set to 0. In some cases, the Pairwise Cipher Suite Count field 405-*c* may be repurposed to indicate a timeout on a link (e.g., the link may be considered to be not in use if there is no Tx/Rx on this link for certain amount of time). Or in other cases, the Pairwise Cipher Suite Count field 405-*c* may be reserved. The Pairwise Cipher Suite List field 405-*d* may not be present is all links share the same security key, as further discussed with reference to FIG. 5. Additionally, Band ID Info field 405-*e* may not be present if all links share the same security key.

In some cases, STA MAC address field 405-*b*, Pairwise Cipher Suite Count field 405-*c*, Pairwise Cipher Suite List field 405-*d*, and Band ID Info field 405-*e* (e.g., set of fields 410) may be optionally included. The presence the set of fields 410 may be signaled via a bit in the field (e.g., multi-band control field 305-*a*), and the set of fields 410 may repeat for each additional link. In some examples, the Pairwise Cipher Suite Count field 405-*c* may indicate whether the links share a security key (e.g., transparent FTS) or if each link has its own security key (e.g., nontransparent FTS), as further described below with reference to FIGS. 5 and 6.

The multi-band connection capability field 405-*a* may refer to an octet that includes toggle information bits indicating devices (e.g., based on device capability) that the STA 115 may or may not connect with. For example, the multi-band connection capability field 405-*a* may toggle 5 bits indicating whether or not the STA 115 may connect with an AP capable device, a PCP capable device, a DLS capable device, a TDLS capable device, or an IBSS capable device. The octet (e.g., the multi-band connection capability field 405-*a*) may also include 3 reserved bits. The remaining 3 reserved bits may be extended to indicate multi-link capability. For example, the remaining 3 bits of the multi-band connection capability field 405-*a* may include a toggle bit that indicates the STA 115 may connect with a multi-link capable STA, and the remaining 2 bits may still act as reserved bits.

The Band ID Info field 405-*e* may, in some cases, include 4 octets (e.g., a Band Info Control octet, a Band ID octet, an Operating Class octet, and a Channel Number octet). In some cases, the Band Info Control octet may include a Band ID Present toggle bit, and Operating Class Present toggle bit, a Channel Number present toggle bit, and 5 reserved bits. Such toggle bits may indicate whether the corresponding fields are present or not.

Figure 5:
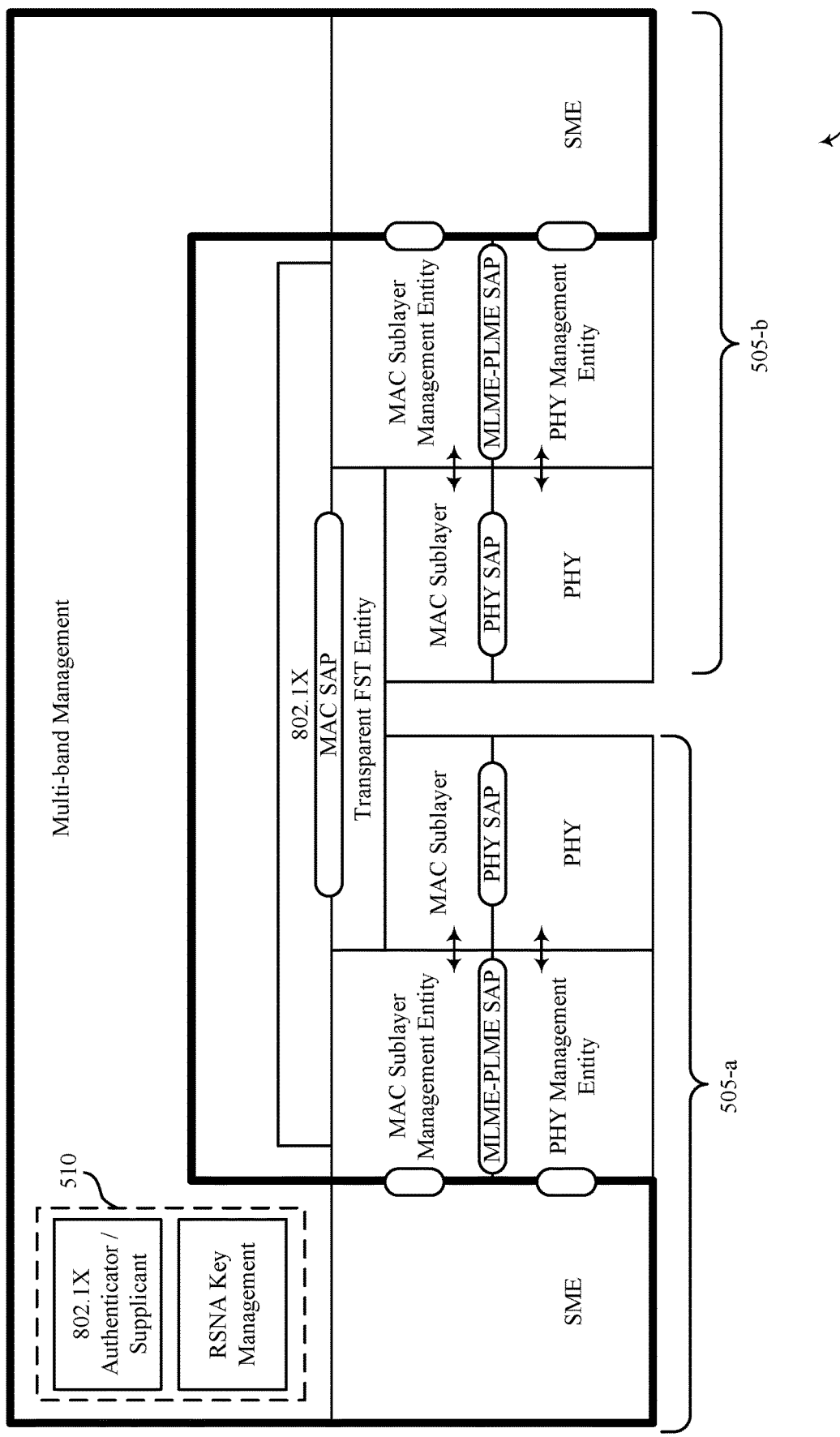
FIG. 5 illustrates an example of a security configuration that supports techniques for multi-link aggregation signaling in accordance with aspects of the present disclosure.

FIG. 5 illustrates an example of a security configuration 500 that supports techniques for multi-link aggregation signaling in accordance with various aspects of the present disclosure. In some examples, security configuration 500 may implement aspects of WLAN 100. Security configuration 500 may illustrate a configuration for a multi-band capable STA with transparent FTS. Security configuration 500 may illustrate a shared security engine 510 (e.g., including shared security keys) across both link 505-*a* and link 505-*b*. That is, the security keys for link 505-*a* and link 505-*b* may be managed and shared across both links (e.g., at either upper layers or lower layers of a STA or multi-link capable device).

Figure 6:
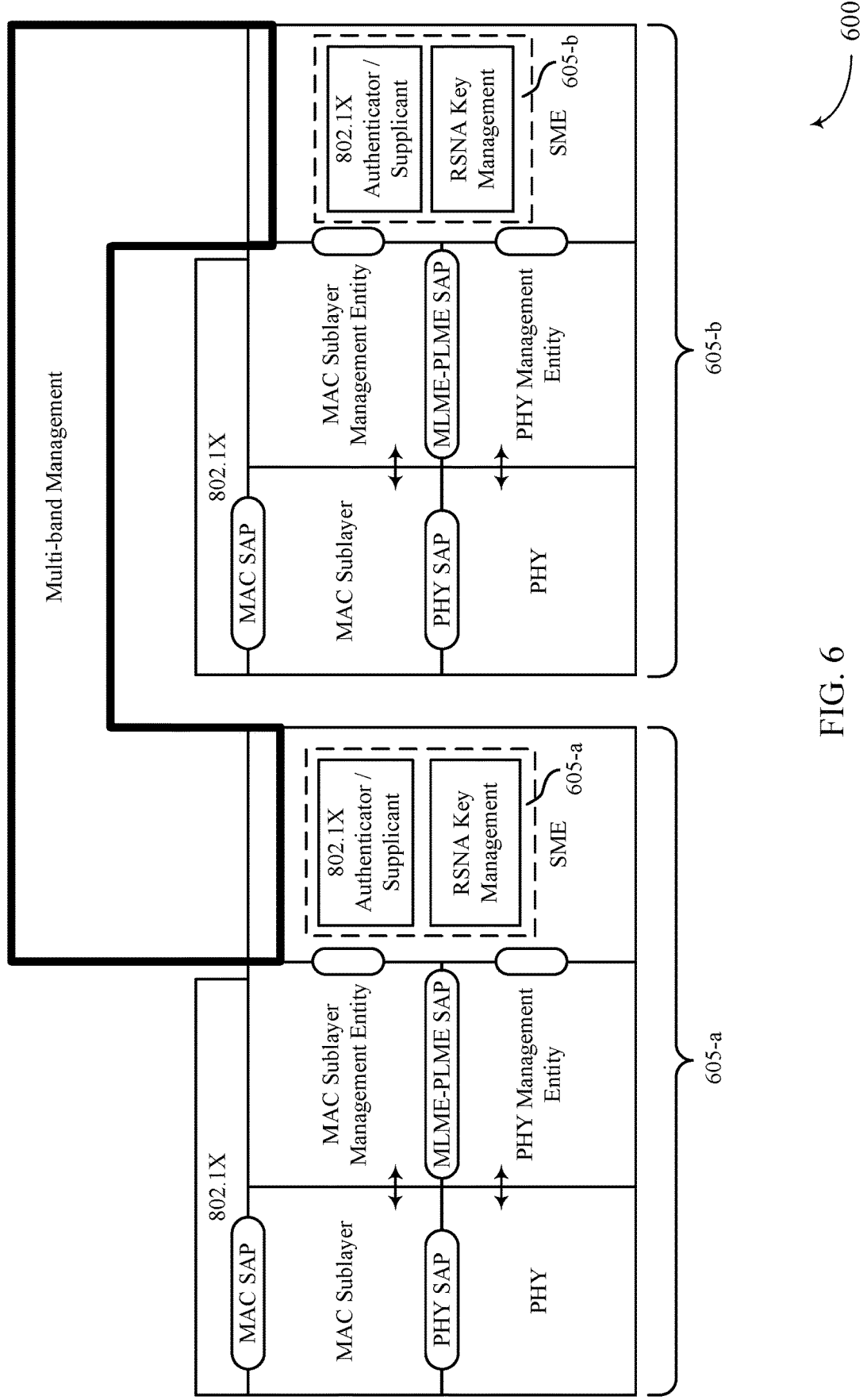
FIG. 6 illustrates an example of a security configuration that supports techniques for multi-link aggregation signaling in accordance with aspects of the present disclosure.

FIG. 6 illustrates an example of a security configuration 600 that supports techniques for multi-link aggregation signaling in accordance with various aspects of the present disclosure. In some examples, security configuration 600 may implement aspects of WLAN 100. Security configuration 600 may illustrate a configuration for a multi-band capable STA with nontransparent FTS. Security configuration 600 may illustrate separate security engines 610 across different wireless links. For example, link 605-*a* may be associated with security engine 610-*a* and link 605-*b* may be associated with security engine 610-*b*. That is, the security keys for link 605-*a* and link 605-*b* may be managed separately (e.g., at either upper layers or lower layers of a STA or multi-link capable device), such that link 605-*a* may use a first set of security keys and link 605-*b* may use a second set of security keys. Such separate security management across links may allow for more robust protection against man-in-the-middle or spoofing security attacks, as one link being compromised may not necessarily compromise the other link (e.g., because the links do not share a single security key).

Figure 7:
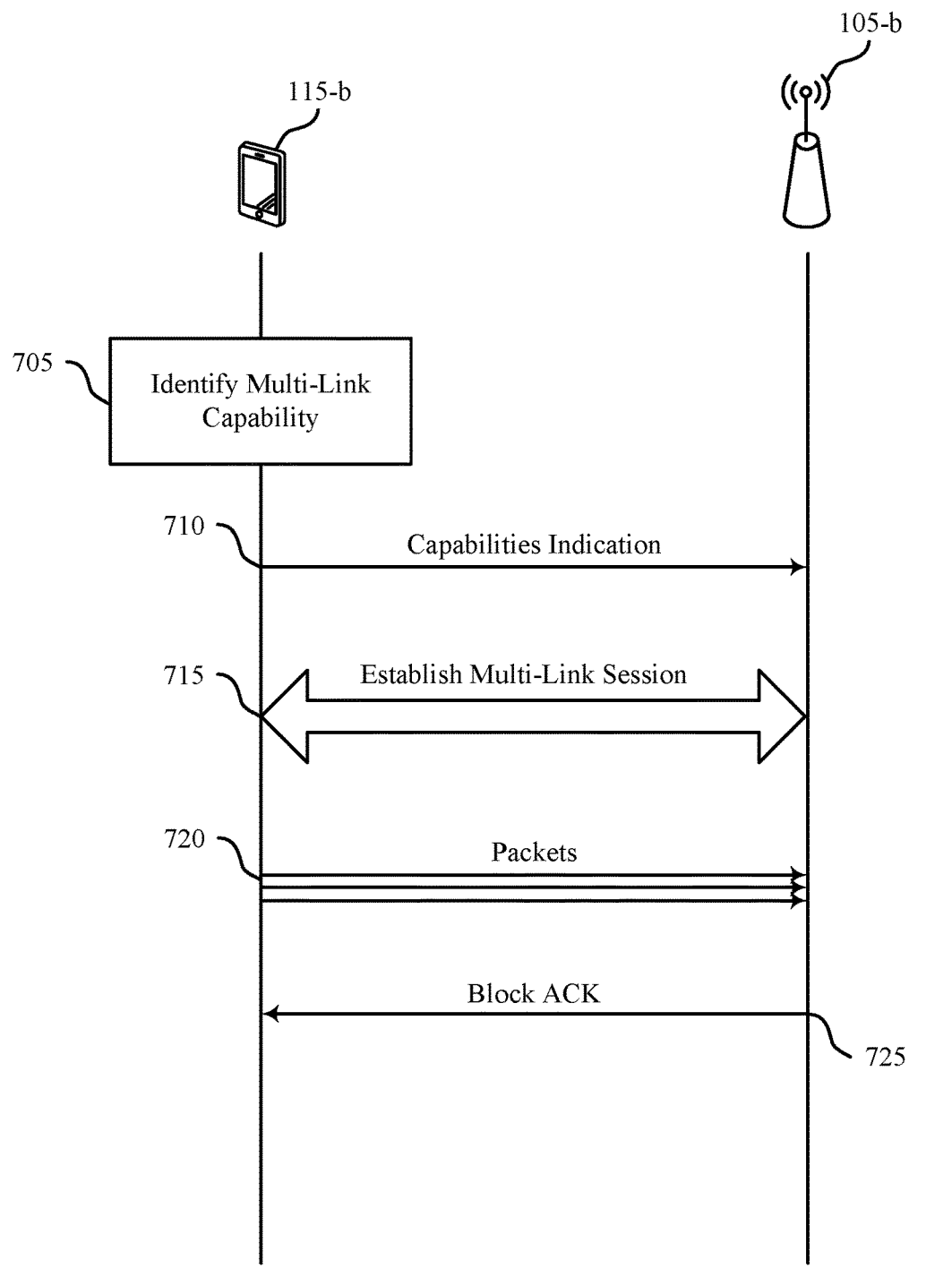
FIG. 7 illustrates an example of a process flow that supports techniques for multi-link aggregation signaling in accordance with aspects of the present disclosure.

FIG. 7 illustrates an example of a process flow 700 that supports techniques for multi-link aggregation signaling in accordance with various aspects of the present disclosure. In some examples, process flow 700 may implement aspects of WLAN 100.

At 705, STA 115-*b* may identify a multi-link aggregation capability (e.g., a capability of the STA 115-*b* to transmit over multiple wireless links between the STA 115-*b* and the AP 105-*b* in parallel). The transmissions over the multiple wireless links may be in parallel such that during at least a duration, transmission may occur at the same time, but the transmissions need not be synchronized or simultaneous. In some cases, synchronized transmissions may refer to transmissions that align with some transmission time boundary (e.g., some predefined transmission time boundary). In some cases, the multi-link aggregation capability may refer to the STA 115-b being capable of establishing a multi-link session. In some examples, identifying multi-link capabilities includes identifying a number of the multiple links that the STA 115-b is capable of aggregating. In some cases, the links may include channels in the same or different RF spectrum band.

At 710, the STA 115-b may transmit an indication of the multi-link aggregation capability. In some cases the indication may include the number of the multiple links that the STA 115-b is capable of aggregating. In some cases, link information for the multiple links (e.g., the first and second wireless links) may be transmitted in an information element via one of the multiple links (e.g., in a multi-band element of a frame). In cases where the information element is a multi-band element, the multi-band element may include a multi-band control field or a multi-band connection capability field of, for example, a beacon, an association request, an association response, a reassociation request, a reassociation response, a probe request, a probe response, an ADDBA request, an ADDBA response, etc. For example, the element may be a multi-band element and may comprise a multi-band control field, a multi-band connection capability field, or other optional sub-elements that may transmit link information for the multiple links. The link information transmitted via the indication may, in some examples, include a MAC address, channel information, an operating class and/or security information for each of the multiple supported links for multi-link aggregation.

At 715, STA 115-b and AP 105-b may establish a multi-link session. In some cases, the multi-link session establishment may be initiated based on the indication transmitted at 710 (e.g., the indication may initiate multi-link session establishment, or the indication may result in the AP 105-b initiating multi-link session establishment). In some cases, 720 may include establishing a BA session between the STA 115-b and the AP 105-b. The BA session may be established for transmission of BAs responsive to transmissions over the multiple wireless links. In some cases, the BA session may be established based on the ADDBA frame. In some cases, the indication at 710 may indicate which link(s) the BA session uses for BARs and BAs. The BA session may use TA, RA, and/or TID information associated with the link(s) indicated.

At 720, STA 115-b may transmit multiple packets to AP 105-b using multiple links (e.g., as indicated by the capabilities indication at 710). At 725, the AP 105-b may transmit a BA, in response to the received packets, based at least in part on the established BA session. For example, at 720, the STA 115-b may receive BAs that take into account the multi-link operation.

Figure 8:
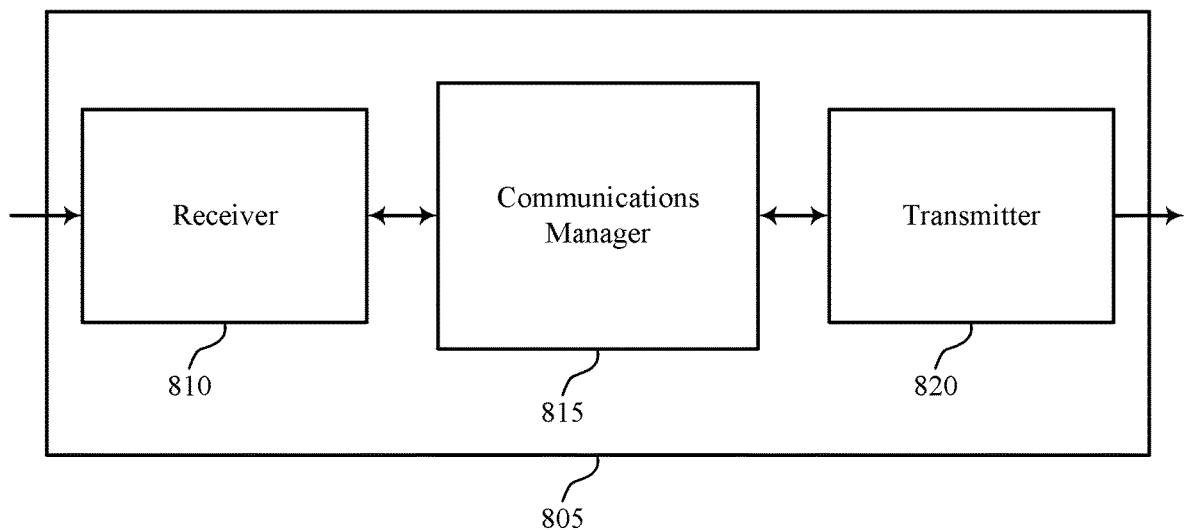
FIGS. 8 through 10 show block diagrams of a device that supports techniques for multi-link aggregation signaling in accordance with aspects of the present disclosure.

FIG. 8 shows a block diagram 800 of a wireless device 805 that supports techniques for multi-link aggregation signaling in accordance with aspects of the present disclosure. Wireless device 805 may be an example of aspects of a STA 115 as described herein. Wireless device 805 may include receiver 810, communications manager 815, and transmitter 820. Wireless device 805 may also include one or more processors, memory coupled with the one or more processors, and instructions stored in the memory that are executable by the one or more processors to enable the one or more processors to perform the features discussed herein.

Each of these components may be in communication with one another (e.g., via one or more buses).

Receiver 810 may receive information such as packets, user data, or control information associated with various information channels (e.g., control channels, data channels, and information related to techniques for multi-link aggregation signaling, etc.). Information may be passed on to other components of the device. The receiver 810 may be an example of aspects of the transceiver 1135 described with reference to FIG. 11. The receiver 810 may utilize a single antenna or a set of antennas.

Communications manager 815 may be an example of aspects of the communications manager 1115 described with reference to FIG. 11.

Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 815 may identify a capability of the first wireless device to transmit in parallel over a set of wireless links between the second wireless device and the first wireless device during at least a first duration of a multi-link session, the set of wireless links including at least a first wireless link and a second wireless link and transmit an indication of the capability. The communications manager 815 may also receive an indication of a capability of a second wireless device to transmit in parallel over a set of wireless links between the second wireless device and the first wireless device during at least a first duration of a multi-link session. Communications manager 815 may identify a first wireless link and a second wireless link of the set of wireless links based on the received indication of the capability, and establish, for the multi-link session, the first wireless link and the second wireless link between the first wireless device and the second wireless device based on the identification.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
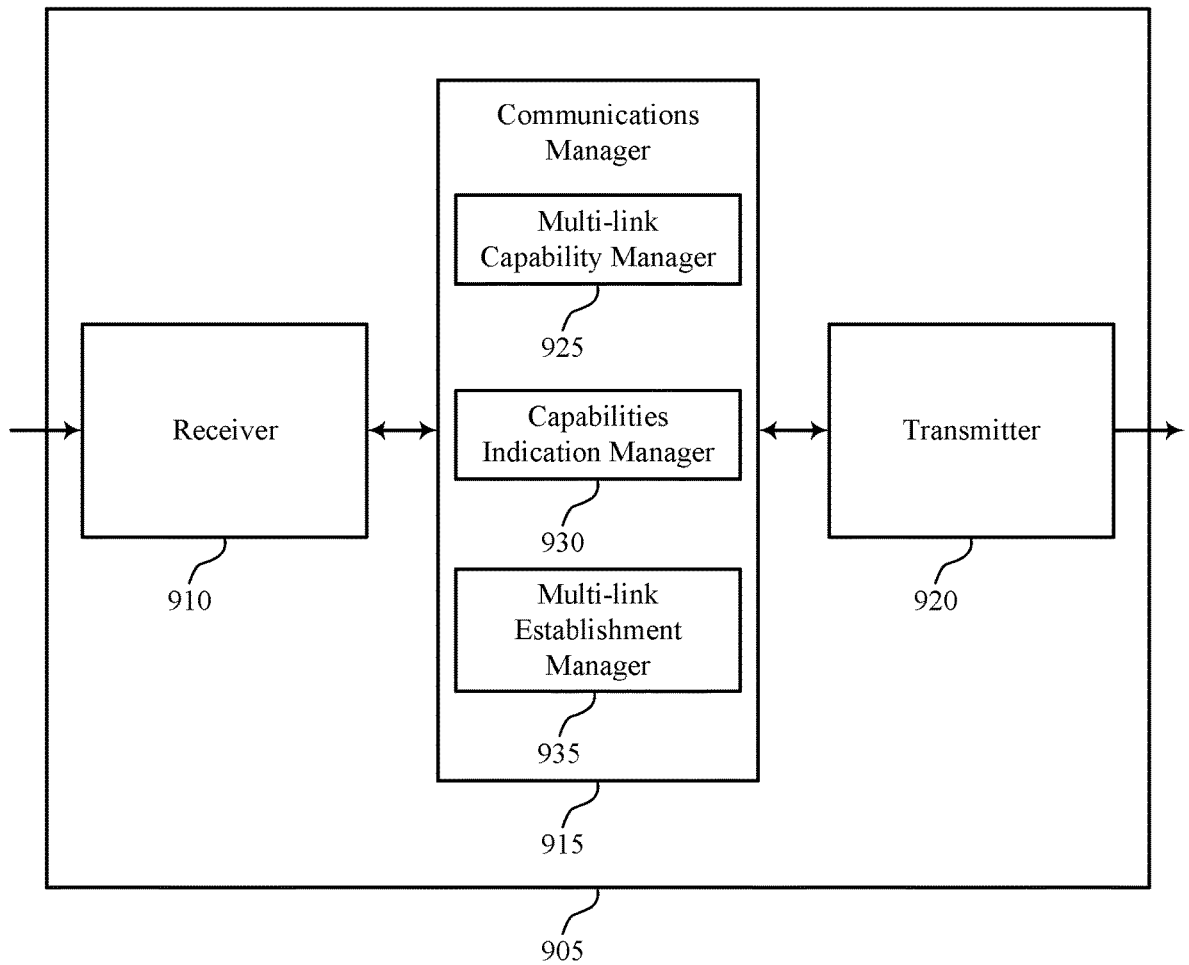

FIG. 9 shows a block diagram 900 of a wireless device 905 that supports techniques for multi-link aggregation signaling in accordance with aspects of the present disclosure. Wireless device 905 may be an example of aspects of a wireless device 805 or a STA 115 as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for multi-link aggregation signaling, etc.). Information may be passed on to other components of the device. The receiver 910 may be an example of aspects of the transceiver 1135 described with reference to FIG. 11. The receiver 910 may utilize a single antenna or a set of antennas.

Communications manager 915 may be an example of aspects of the communications manager 1115 described with reference to FIG. 11. Communications manager 915 may also include multi-link capability manager 925, capabilities indication manager 930, and multi-link establishment manager 935.

Multi-link capability manager 925 may identify a capability of the first wireless device to transmit in parallel over a set of wireless links between the second wireless device and the first wireless device during at least a first duration of a multi-link session. In some cases, the set of wireless links may include at least a first wireless link and a second wireless link. Multi-link capability manager 925 may identify a number of the set of wireless links and receive, from the second wireless device, an indication of a capability of the second wireless device to aggregate a second set of wireless links, the second set of wireless links including at least the first wireless link and the second wireless link. In some cases, establishing the first wireless link and the second wireless link is based on the capability of the first wireless device and the received indication of the capability of the second wireless device. Multi-link capability manager 925 may receive an indication of a capability of a second wireless device to transmit in parallel over a set of wireless links between the second wireless device and the first wireless device during at least a first duration of a multi-link session. In some cases, the first wireless link includes a first wireless channel in a first RF spectrum band. In some cases, the second wireless link includes a second wireless channel in the first RF spectrum band or a second RF spectrum band. Multi-link capability manager 925 may transmit the indication of the capability using the first wireless link in the first RF spectrum band, where the indication of the capability indicates that the second wireless link comprises the wireless channel in the second RF frequency band. Multi-link capability manager 925 may perform a session transfer from the first wireless link to the second wireless after the indication of the capability is transmitted. In some cases, the first wireless channel comprises a channel in a 2.4 GHz band or a channel in a 5 GHz band, and the second wireless channel comprises a channel in a 6 GHz band.

Capabilities indication manager 930 may transmit an indication of the capability, transmit an indication of the number of the set of wireless links, and transmit link information for the second wireless link in a second portion of the information element. In some cases, transmitting the indication of the capability includes: transmitting link information for the first wireless link in a first portion of an information element. In some cases, the link information for the first wireless link includes a first MAC address, channel information, an operating class, security information, or a combination thereof, for the first wireless link. In some cases, the link information for the second wireless link includes a second MAC address, channel information, an operating class, security information, or a combination thereof, for the second wireless link. In some cases, transmitting the indication of the capability includes: transmitting the indication of the capability in an element of a frame. In some cases, the element includes a multi-band element. In some cases, the element of the frame includes a multi-band element comprising one or both of a multi-band control field or a multi-band connection capability field, the indication of the capability transmitted in the multi-band control field or the multi-band connection capability field. In some cases, transmitting the indication of the capability in the multi-band element of the frame includes: transmitting the indication of the capability in a beacon, or an association request, or an association response, or a reassociation request, or a reassociation response, or a probe request, or a probe response, or an ADDBA request, or an ADDBA response, or a combination thereof. In some cases, the element of the frame comprises an optional sub-element of a multi-band element, the indication of the capability transmitted in the optional sub-element. Capabilities indication manager 930 may establish a first BA session between the first wireless device and the second wireless device, the first BA session for transmission of BAs responsive to transmissions on the first wireless link, and capabilities indication manager 930 may establishing a second BA session between the first wireless device and the second wireless device, the second BA session for transmission of BAs responsive to transmissions on the second wireless link.

Multi-link establishment manager 935 may establish the multi-link session between the first wireless device and the second wireless device based on the indication of the capability, identify a first wireless link and a second wireless link of the set of wireless links based on the received indication of the capability, and establish, for the multi-link session, the first wireless link and the second wireless link between the first wireless device and the second wireless device based on the identification.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
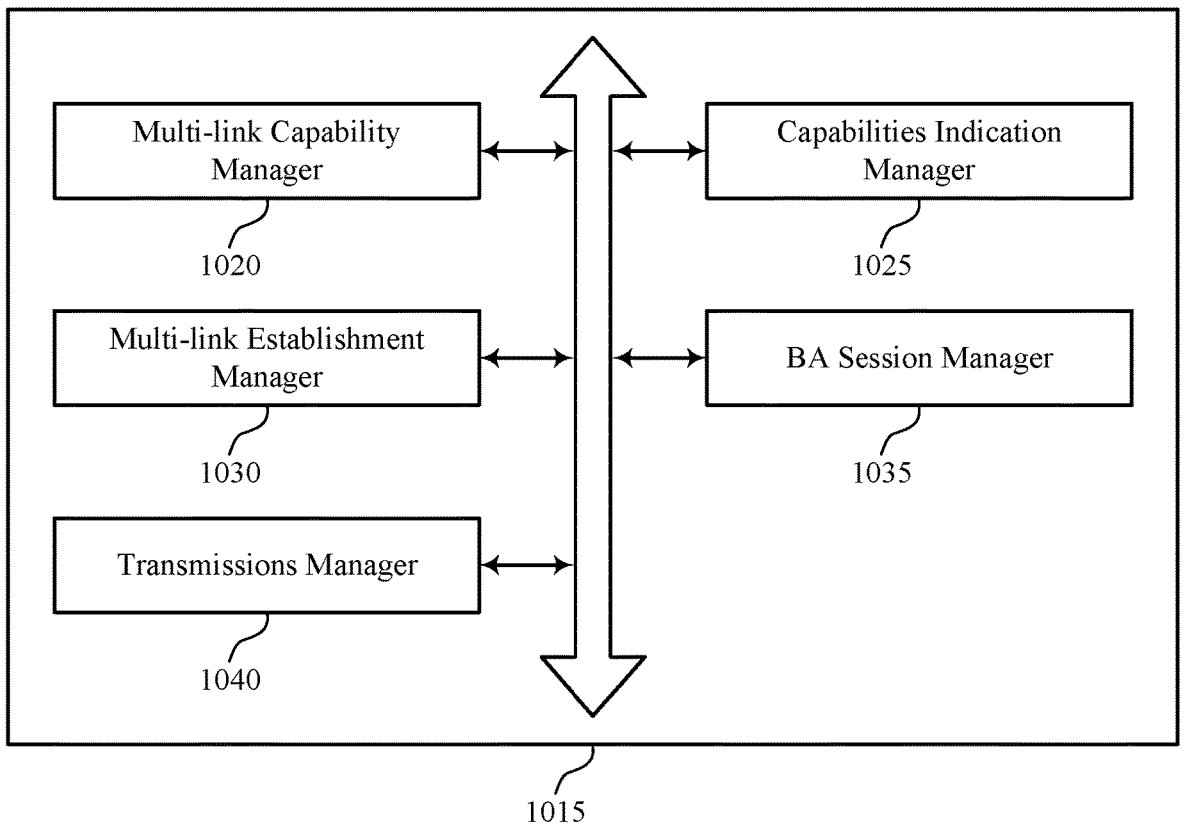

FIG. 10 shows a block diagram 1000 of a communications manager 1015 that supports techniques for multi-link aggregation signaling in accordance with aspects of the present disclosure. The communications manager 1015 may be an example of aspects of a communications manager 815, a communications manager 915, or a communications manager 1115 described with reference to FIGS. 8, 9, and 11. The communications manager 1015 may include multi-link capability manager 1020, capabilities indication manager 1025, multi-link establishment manager 1030, BA session manager 1035, and transmissions manager 1040. Each of these modules may communicate, directly or indirectly, with one another (e.g., via one or more buses).

Multi-link capability manager 1020 may identify a capability of the first wireless device to transmit in parallel over a set of wireless links between the second wireless device and the first wireless device during at least a first duration of a multi-link session, the set of wireless links including at least a first wireless link and a second wireless link. In some cases, multi-link capability manager 1020 may identify a number of the set of wireless links, and receive, from the second wireless device, an indication of a capability of the second wireless device to aggregate a second set of wireless links, the second set of wireless links including at least the first wireless link and the second wireless link. In some cases, establishing the first wireless link and the second wireless link is based on the capability of the first wireless device and the received indication of the capability of the second wireless device. Multi-link capability manager 1020 may receive an indication of a capability of a second wireless device to transmit in parallel over a set of wireless links between the second wireless device and the first wireless device during at least a first duration of a multi-link session. In some cases, the first wireless link includes a first wireless channel in a first RF spectrum band. In some cases, the second wireless link includes a second wireless channel in the first RF spectrum band or a second RF spectrum band. Multi-link capability manager 1020 may transmit the indication of the capability using the first wireless link in the first RF spectrum band, where the indication of the capability indicates that the second wireless link comprises the wireless channel in the second RF frequency band. Multi-link capability manager 1020 may perform a session transfer from the first wireless link to the second wireless after the indication of the capability is transmitted. In some cases, the first wireless channel comprises a channel in a 2.4 GHz band or a channel in a 5 GHz band, and the second wireless channel comprises a channel in a 6 GHz band.

Capabilities indication manager 1025 may transmit an indication of the capability, transmit an indication of the number of the set of wireless links, and transmit link information for the second wireless link in a second portion of the information element. In some cases, transmitting the indication of the capability includes: transmitting link information for the first wireless link in a first portion of an information element. In some cases, the link information for the first wireless link includes a first MAC address, channel information, an operating class, security information, or a combination thereof, for the first wireless link. In some cases, the link information for the second wireless link includes a second MAC address, channel information, an operating class, security information, or a combination thereof, for the second wireless link. In some cases, transmitting the indication of the capability includes: transmitting the indication of the capability in an element of a frame. In some cases, the element includes a multi-band element. In some cases, the element of the frame includes a multi-band element comprising one or both of a multi-band control field or a multi-band connection capability field, the indication of the capability transmitted in the multi-band control field or the multi-band connection capability field. In some cases, transmitting the indication of the capability in the multi-band element of the frame includes: transmitting the indication of the capability in a beacon, or an association request, or an association response, or a reassociation request, or a reassociation response, or a probe request, or a probe response, or an ADDBA request, or an ADDBA response, or a combination thereof. In some cases, the element of the frame comprises an optional sub-element of a multi-band element, the indication of the capability transmitted in the optional sub-element. Capabilities indication manager 1025 may establish a first BA session between the first wireless device and the second wireless device, the first BA session for transmission of BAs responsive to transmissions on the first wireless link, and Capabilities indication manager 1025 may establishing a second BA session between the first wireless device and the second wireless device, the second BA session for transmission of BAs responsive to transmissions on the second wireless link.

Multi-link establishment manager 1030 may establish the multi-link session between the first wireless device and the second wireless device based on the indication of the capability, identify a first wireless link and a second wireless link of the set of wireless links based on the received indication of the capability, and establish, for the multi-link session, the first wireless link and the second wireless link between the first wireless device and the second wireless device based on the identification.

BA session manager 1035 may establish a BA session between the first wireless device and the second wireless device, the BA session for transmission of BAs responsive to transmissions over the first wireless link and the second wireless link. In some cases, BA session manager 1035 may exchange an ADDBA frame, where the ADDBA frame is used to establish the BA session on one of the first wireless link or the second wireless link, the one of the first wireless link or the second wireless link used to transmit BARs and BAs in response to the BARs. In some cases, BA session manager 1035 may transmit an indication that the BA session uses the first wireless link, or the second wireless link, or a combination thereof, to provide to transmit the BAs. For example, in some cases BA session manager 1035 may indicate BAs correspond to transmissions received on the first wireless link and the second wireless link (e.g., BA sessions may correspond to transmissions over multiple links). In other cases, BA session manager 1035 may indicate (e.g., establish) a BA session on the first wireless link and a BA session on the second wireless link (e.g., BA sessions may be independently established for each link). In some cases, BA session manager 1035 may receive, from the second wireless device, a BA responsive to the first set and the second set. In some cases, BA session manager 1035 may transmit, to the second wireless device, a BA responsive to the first set and the second set. For example, in some cases, BA session manager 1035 may receive, and transmit, BAs responsive to transmissions of the first set and the second set of wireless links, respectively. In some cases, BA session manager 1035 receive a plurality of packets from the second wireless device, a first set of the plurality of packets transmitted over the first wireless link during a same time duration as a second set of the plurality of packets transmitted over the second wireless link, transmit, to the second wireless device, a first BA responsive to the first set, and transmit, to the second wireless device, a second BA responsive to the second set. In some cases, the indication that the BA session uses the first wireless link, or the second wireless link, or a combination thereof, includes a TA, a RA, and a TID for the first wireless link, or a TA, a RA, and a TID for the second wireless link, or a combination thereof.

Transmissions manager 1040 may transmit a set of packets to the second wireless device, a first set of the set of packets transmitted over the first wireless link during a same time duration as a second set of the set of packets transmitted over the second wireless link and receive a set of packets from the second wireless device, a first set of the set of packets transmitted over the first wireless link during a same time duration as a second set of the set of packets transmitted over the second wireless link.

Figure 11:
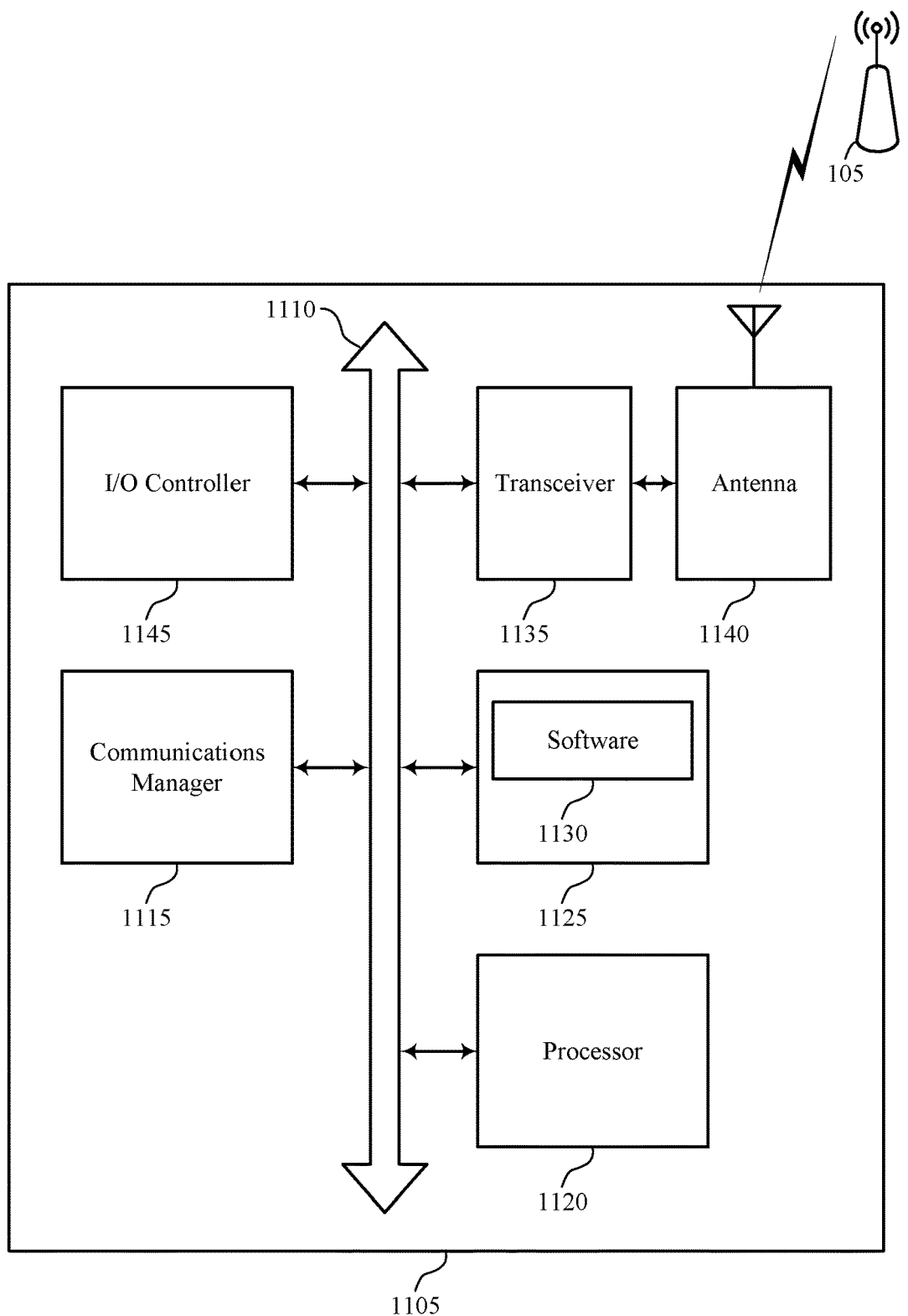
FIG. 11 illustrates a block diagram of a system including a station (STA) that supports techniques for multi-link aggregation signaling in accordance with aspects of the present disclosure.

FIG. 11 shows a diagram of a system 1100 including a device 1105 that supports techniques for multi-link aggregation signaling in accordance with aspects of the present disclosure. Device 1105 may be an example of or include the components of wireless device 805, wireless device 905, or a STA 115 as described above, e.g., with reference to FIGS. 8 and 9. Device 1105 may include components for bi-directional voice and data communications including components for transmitting and receiving communications, including communications manager 1115, processor 1120, memory 1125, software 1130, transceiver 1135, antenna 1140, and I/O controller 1145. These components may be in electronic communication via one or more buses (e.g., bus 1110).

Processor 1120 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for multi-link aggregation signaling).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support techniques for multi-link aggregation signaling. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, over wired or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
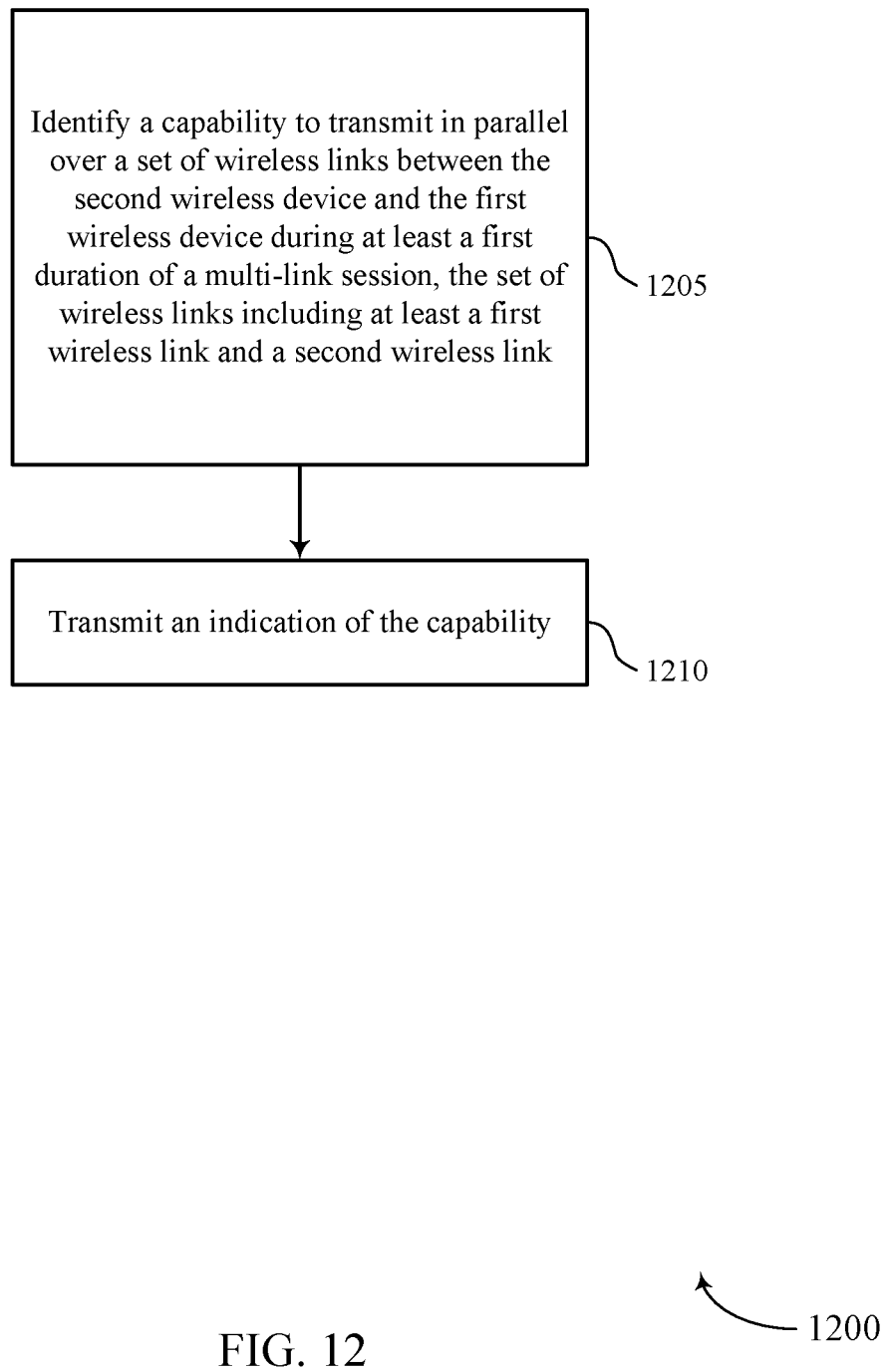
FIGS. 12 through 15 illustrate methods for techniques for multi-link aggregation signaling in accordance with aspects of the present disclosure.

FIG. 12 shows a flowchart illustrating a method 1200 for techniques for multi-link aggregation signaling in accordance with aspects of the present disclosure. The operations of method 1200 may be implemented by a STA 115 or its components as described herein. For example, the operations of method 1200 may be performed by a communications manager as described with reference to FIGS. 8 through 11. In some examples, a STA 115 may execute a set of codes to control the functional elements of the device to perform the functions described below. Additionally or alternatively, the STA 115 may perform aspects of the functions described below using special-purpose hardware.

At block 1205 the STA 115 may identify a capability of the first wireless device to transmit in parallel over a plurality of wireless links between the second wireless device and the first wireless device during at least a first duration of a multi-link session, the plurality of wireless links including at least a first wireless link and a second wireless link. The operations of block 1205 may be performed according to the methods described herein. In certain examples, aspects of the operations of block 1205 may be performed by a multi-link capability manager as described with reference to FIGS. 8 through 11.

At block 1210 the STA 115 may transmit an indication of the capability. The operations of block 1210 may be performed according to the methods described herein. In certain examples, aspects of the operations of block 1210 may be performed by a capabilities indication manager as described with reference to FIGS. 8 through 11.

Figure 13:
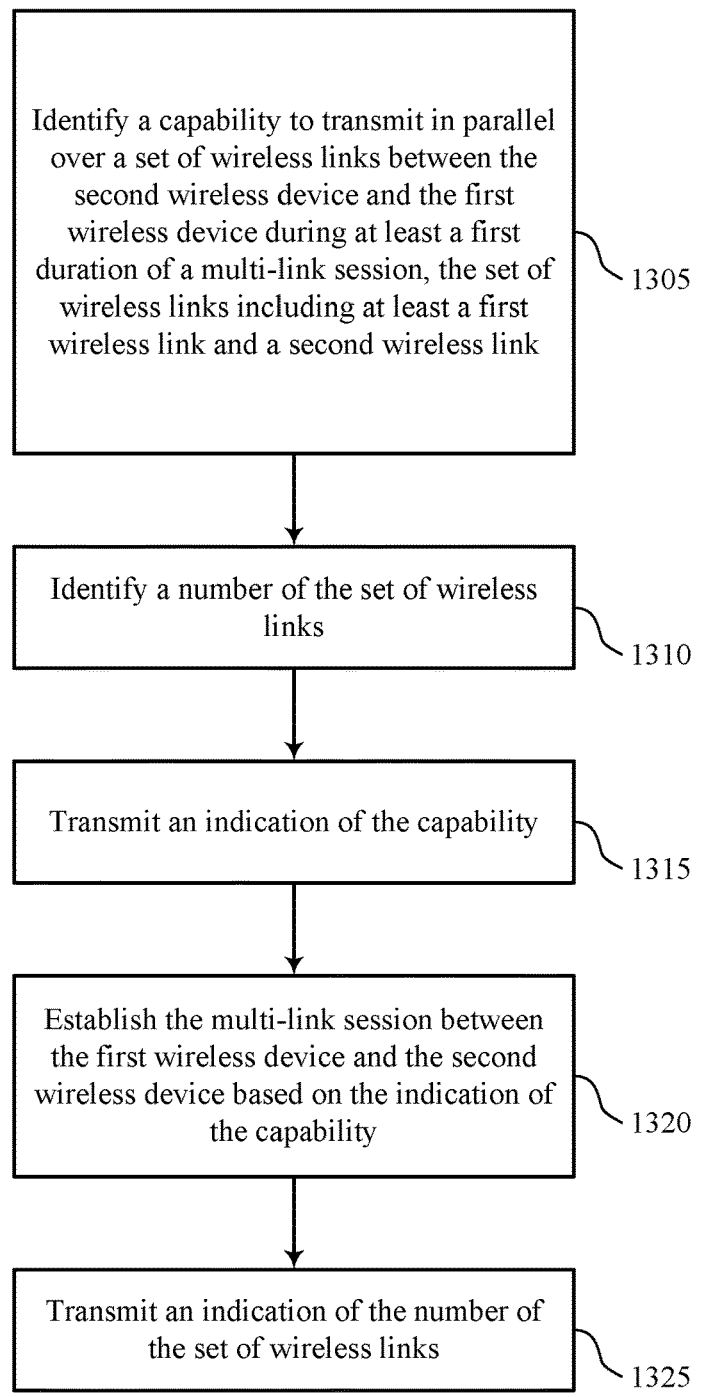

FIG. 13 shows a flowchart illustrating a method 1300 for techniques for multi-link aggregation signaling in accordance with aspects of the present disclosure. The operations of method 1300 may be implemented by a STA 115 or its components as described herein. For example, the operations of method 1300 may be performed by a communications manager as described with reference to FIGS. 8 through 11. In some examples, a STA 115 may execute a set of codes to control the functional elements of the device to perform the functions described below. Additionally or alternatively, the STA 115 may perform aspects of the functions described below using special-purpose hardware.

At block 1305 the STA 115 may identify a capability of the first wireless device to transmit in parallel over a plurality of wireless links between the second wireless device and the first wireless device during at least a first duration of a multi-link session, the plurality of wireless links including at least a first wireless link and a second wireless link. The operations of block 1305 may be performed according to the methods described herein. In certain examples, aspects of the operations of block 1305 may be performed by a multi-link capability manager as described with reference to FIGS. 8 through 11.

At block 1310 the STA 115 may identify a number of the plurality of wireless links. The operations of block 1310 may be performed according to the methods described herein. In certain examples, aspects of the operations of block 1310 may be performed by a multi-link capability manager as described with reference to FIGS. 8 through 11.

At block 1315 the STA 115 may transmit an indication of the capability. The operations of block 1315 may be performed according to the methods described herein. In certain examples, aspects of the operations of block 1315 may be performed by a capabilities indication manager as described with reference to FIGS. 8 through 11.

At block 1320 the STA 115 may establish the multi-link session between the first wireless device and the second wireless device based at least in part on the indication of the capability. The operations of block 1320 may be performed according to the methods described herein. In certain examples, aspects of the operations of block 1320 may be performed by a multi-link establishment manager as described with reference to FIGS. 8 through 11.

At block 1325 the STA 115 may transmit an indication of the number of the plurality of wireless links. The operations of block 1325 may be performed according to the methods described herein. In certain examples, aspects of the operations of block 1325 may be performed by a capabilities indication manager as described with reference to FIGS. 8 through 11.

Figure 14:
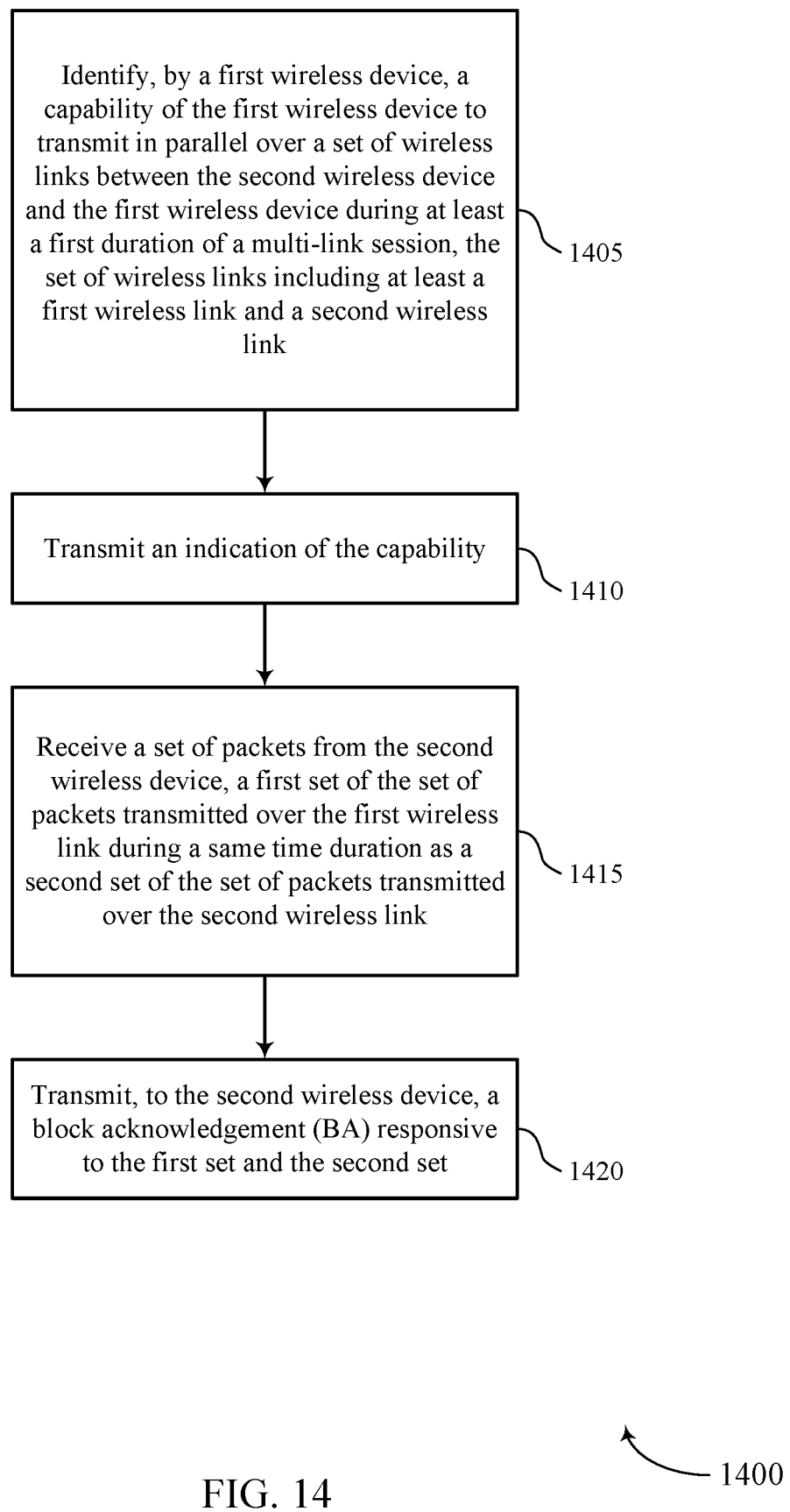

FIG. 14 shows a flowchart illustrating a method 1400 for techniques for multi-link aggregation signaling in accordance with aspects of the present disclosure. The operations of method 1400 may be implemented by a STA 115 or its components as described herein. For example, the operations of method 1400 may be performed by a communications manager as described with reference to FIGS. 8 through 11. In some examples, a STA 115 may execute a set of codes to control the functional elements of the device to perform the functions described below. Additionally or alternatively, the STA 115 may perform aspects of the functions described below using special-purpose hardware.

At block 1405 the STA 115 may identify a capability of the first wireless device to transmit in parallel over a plurality of wireless links between the second wireless device and the first wireless device during at least a first duration of a multi-link session, the plurality of wireless links including at least a first wireless link and a second wireless link. The operations of block 1405 may be performed according to the methods described herein. In certain examples, aspects of the operations of block 1405 may be performed by a multi-link capability manager as described with reference to FIGS. 8 through 11.

At block 1410 the STA 115 may transmit an indication of the capability. The operations of block 1410 may be performed according to the methods described herein. In certain examples, aspects of the operations of block 1410 may be performed by a capabilities indication manager as described with reference to FIGS. 8 through 11.

At block 1415 the STA 115 may receive a plurality of packets from the second wireless device, a first set of the plurality of packets transmitted over the first wireless link during a same time duration as a second set of the plurality of packets transmitted over the second wireless link. The operations of block 1415 may be performed according to the methods described herein. In certain examples, aspects of the operations of block 1415 may be performed by a transmissions manager as described with reference to FIGS. 8 through 11.

At block 1420 the STA 115 may transmit, to the second wireless device, a BA responsive to the first set and the second set. The operations of block 1420 may be performed according to the methods described herein. In certain examples, aspects of the operations of block 1420 may be performed by a BA session manager as described with reference to FIGS. 8 through 11.

Figure 15:
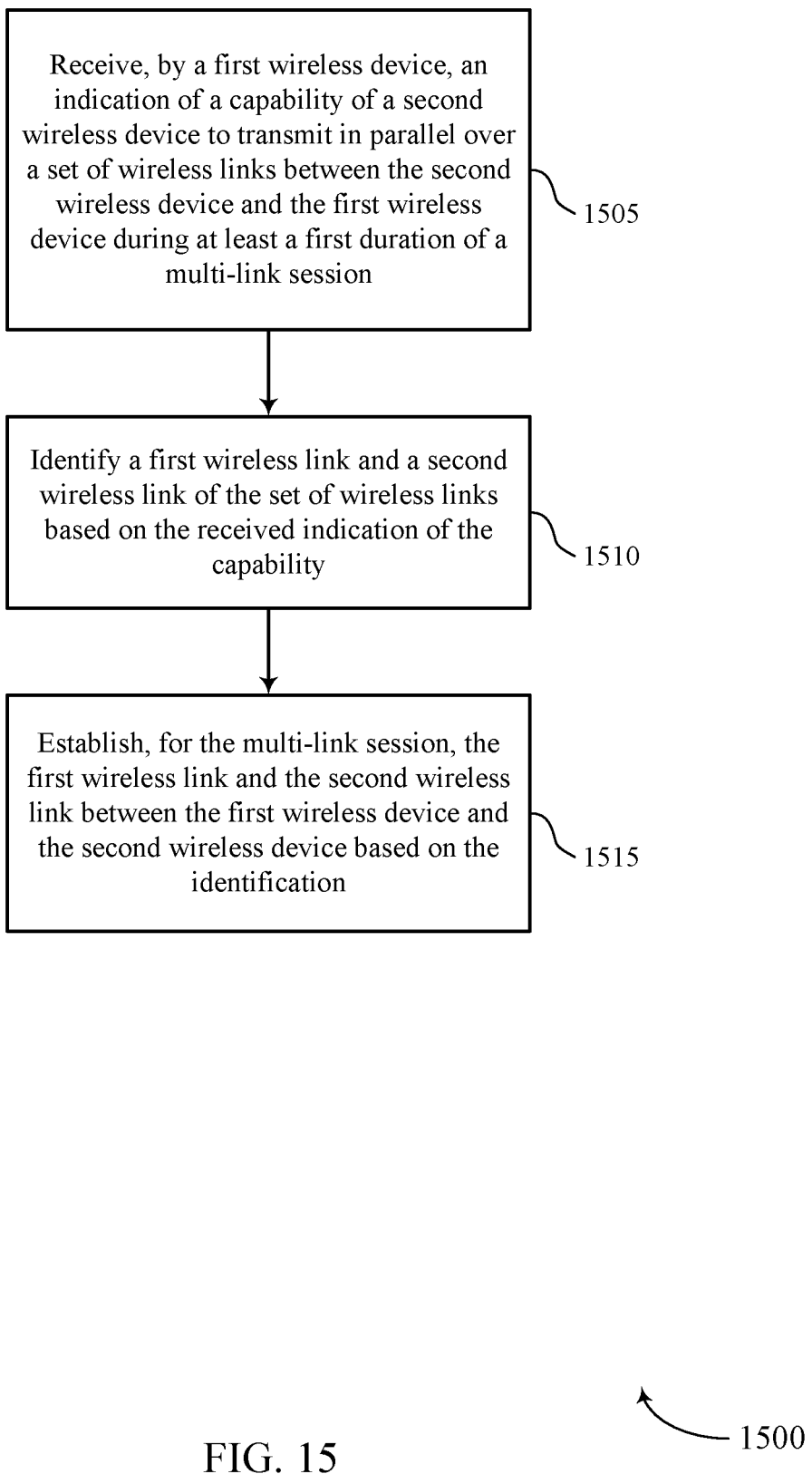

FIG. 15 shows a flowchart illustrating a method 1500 for techniques for multi-link aggregation signaling in accordance with aspects of the present disclosure. The operations of method 1500 may be implemented by a STA 115 or its components as described herein. For example, the operations of method 1500 may be performed by a communications manager as described with reference to FIGS. 8 through 11. In some examples, a STA 115 may execute a set of codes to control the functional elements of the device to perform the functions described below. Additionally or alternatively, the STA 115 may perform aspects of the functions described below using special-purpose hardware.

At block 1505 the STA 115 may receive an indication of a capability of a second wireless device to transmit in parallel over a plurality of wireless links between the second wireless device and the first wireless device during at least a first duration of a multi-link session. The operations of block 1505 may be performed according to the methods described herein. In certain examples, aspects of the operations of block 1505 may be performed by a multi-link capability manager as described with reference to FIGS. 8 through 11.

At block 1510 the STA 115 may identify a first wireless link and a second wireless link of the plurality of wireless links based at least in part on the received indication of the capability. The operations of block 1510 may be performed according to the methods described herein. In certain examples, aspects of the operations of block 1510 may be performed by a multi-link establishment manager as described with reference to FIGS. 8 through 11.

At block 1515 the STA 115 may establish, for the multi-link session, the first wireless link and the second wireless link between the first wireless device and the second wireless device based at least in part on the identification. The operations of block 1515 may be performed according to the methods described herein. In certain examples, aspects of the operations of block 1515 may be performed by a multi-link establishment manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication, comprising:
identifying, by a first wireless device, a capability of the first wireless device to transmit in parallel over a plurality of wireless links between a second wireless device and the first wireless device during at least a first duration of a multi-link session, the plurality of wireless links including at least a first wireless link and a second wireless link, the first wireless link identified by a first combination of a transmitter address (TA) and a receiver address (RA), and the second wireless link identified by a second combination of a TA and an RA, wherein the first combination is different than the second combination;

transmitting an indication of the capability to the second wireless device, wherein the indication further implies that a block acknowledgment (BA) session is for both the first wireless link and the second wireless link; and establishing a BA session between the first wireless device and the second wireless device, wherein the BA session corresponds to one traffic identifier (TID) of a set of TIDs, and the BA session is for BAs responsive to the transmissions associated with frames belonging to the TID in parallel over the first wireless link and the second wireless link.

2. The method of claim 1, further comprising:
establishing the multi-link session between the first wireless device and the second wireless device based at least in part on the indication of the capability.

3. The method of claim 1, further comprising:
identifying a number of the plurality of wireless links; and
transmitting an indication of the number of the plurality of wireless links.

4. The method of claim 1, wherein transmitting the indication of the capability comprises:
transmitting link information for the first wireless link, the link information for the first wireless link comprising a first media access control (MAC) address, channel information, an operating class, security information, or a combination thereof, for the first wireless link; and
transmitting link information for the second wireless link, the link information for the second wireless link comprising a second MAC address, channel information, an operating class, security information, or a combination thereof, for the second wireless link.

5. The method of claim 1, wherein transmitting the indication of the capability comprises:
transmitting the indication of the capability in an element of a frame.

6. The method of claim 5, wherein the element of the frame comprises a multi-band element comprising one or both of a multi-band control field or a multi-band connection capability field, the indication of the capability transmitted in the multi-band control field or the multi-band connection capability field.

7. The method of claim 6, wherein transmitting the indication of the capability in the multi-band element of the frame comprises:
transmitting the indication of the capability in a beacon, or an association request, or an association response, or a reassociation request, or a reassociation response, or a probe request, or a probe response, or an add block acknowledgement (ADDBA) request, or an ADDBA response, or a combination thereof.

8. The method of claim 5, wherein the element of the frame comprises an optional sub-element of a multi-band element, the indication of the capability transmitted in the optional sub-element.

9. The method of claim 1, wherein establishing the BA session comprises:
establishing a first BA session between the first wireless device and the second wireless device, the first BA session for transmission of BAs responsive to transmissions on the first wireless link; and
establishing a second BA session between the first wireless device and the second wireless device, the second BA session for transmission of BAs responsive to transmissions on the second wireless link.

10. The method of claim 1, further comprising:
transmitting an indication that the BA session uses the first wireless link, or the second wireless link, or a combination thereof, for transmission of the BAs.

11. The method of claim 10, wherein the indication that the BA session uses the first wireless link, or the second wireless link, or a combination thereof, comprises the TA, the RA, and the TID for the first wireless link, or the TA, the RA, and the TID for the second wireless link, or a combination thereof.

12. The method of claim 1, further comprising:
transmitting a plurality of packets to the second wireless device, a first set of the plurality of packets transmitted over the first wireless link during a same time duration as a second set of the plurality of packets transmitted over the second wireless link; and
receiving, from the second wireless device, a BA responsive to the first set and the second set.

13. The method of claim 1, further comprising:
receiving a plurality of packets from the second wireless device, a first set of the plurality of packets transmitted over the first wireless link during a same time duration as a second set of the plurality of packets transmitted over the second wireless link; and
transmitting, to the second wireless device, a BA responsive to the first set and the second set.

14. The method of claim 1, further comprising:
receiving a plurality of packets from the second wireless device, a first set of the plurality of packets transmitted over the first wireless link during a same time duration as a second set of the plurality of packets transmitted over the second wireless link;
transmitting, to the second wireless device, a first BA responsive to the first set; and
transmitting, to the second wireless device, a second BA responsive to the second set.

15. The method of claim 1, wherein:
the first wireless link comprises a first wireless channel in a first radio frequency (RF) spectrum band; and
the second wireless link comprises a second wireless channel in the first RF spectrum band or a second RF spectrum band.

16. The method of claim 15, wherein transmitting the indication of the capability comprises:
transmitting the indication of the capability using the first wireless link in the first RF spectrum band, wherein the indication of the capability indicates that the second wireless link comprises the second wireless channel in the second RF spectrum band.

17. The method of claim 16, further comprising:
performing a session transfer from the first wireless link to the second wireless after the indication of the capability is transmitted.

18. The method of claim 15, wherein the first wireless channel comprises a channel in a 2.4 GHz band or a channel in a 5 GHz band, and the second wireless channel comprises a channel in a 6 GHz band.

19. A method for wireless communication, comprising:
receiving, by a first wireless device, an indication of a capability of a second wireless device to transmit in parallel over a plurality of wireless links between the second wireless device and the first wireless device during at least a first duration of a multi-link session, the plurality of wireless links including at least a first wireless link and a second wireless link, the first wireless link identified by a first combination of a transmitter address (TA) and a receiver address (RA), and the second wireless link identified by a second combination of a TA and an RA, wherein the first combination is different than the second combination, wherein the indication further implies that a block acknowledgment (BA) session is for both the first wireless link and the second wireless link;

identifying the first wireless link and the second wireless link of the plurality of wireless links based at least in part on the received indication of the capability;

establishing, for the multi-link session, the first wireless link and the second wireless link between the first wireless device and the second wireless device based at least in part on the identification; and receiving, from the second wireless device, one or more BAs based at least in part on the BA session.

20. The method of claim 19, further comprising:

identifying a number of the plurality of wireless links based at least in part on a received indication of the number of the plurality of wireless links.

21. The method of claim 19, wherein receiving the indication of the capability comprises:

receiving link information for the first wireless link, the link information comprising a first media access control (MAC) address, channel information, an operating class, security information, or a combination thereof, for the first wireless link; and receiving link information for the second wireless link, the link information comprising a second MAC address, channel information, an operating class, security information, or a combination thereof, for the second wireless link.

22. The method of claim 19, wherein receiving the indication of the capability comprises:

receiving the indication of the capability in one or both of a multi-band control field or a multi-band connection capability field, the multi-band control field or the multi-band connection capability field in a beacon, or an association request, or an association response, or a reassociation request, or a reassociation response, or a probe request, or a probe response, or an add block acknowledgement (ADDBA) request, or an ADDBA response, or a combination thereof.

23. An apparatus for wireless communication, comprising:

a processor, memory in electronic communication with the processor; and instructions stored in the memory and executable by the processor to cause the apparatus to:

identify, by a first wireless device, a capability of the first wireless device to transmit in parallel over a plurality of wireless links between a second wireless device and the first wireless device during at least a first duration of a multi-link session, the plurality of wireless links including at least a first wireless link and a second wireless link, the first wireless link identified by a first combination of a transmitter address (TA) and a receiver address (RA), and the second wireless link identified by a second combination of a TA and an RA, wherein the first combination is different than the second combination;

transmit an indication of the capability, wherein the indication further implies that a block acknowledgment (BA) session is for both the first wireless link and the second wireless link; and establish a BA session between the first wireless device and the second wireless device, wherein the BA session corresponds to one traffic identifier (TID) of a set of TIDs, and the BA session is for BAs responsive to the transmissions associated with frames belonging to the TID in parallel over the first wireless link and the second wireless link.

24. The apparatus of claim 23, wherein the instructions are further executable by the processor to cause the apparatus to:

establish the multi-link session between the first wireless device and the second wireless device based at least in part on the indication of the capability.

25. The apparatus of claim 23, wherein the instructions are further executable by the processor to cause the apparatus to:

identify a number of the plurality of wireless links; and transmit an indication of the number of the plurality of wireless links.

26. The apparatus of claim 23, wherein the instructions to transmit the indication of the capability are executable by the processor to cause the apparatus to:

transmit link information for the first wireless link, the link information for the first wireless link comprising a first media access control (MAC) address, channel information, an operating class, security information, or a combination thereof, for the first wireless link; and transmit link information for the second wireless link, the link information for the second wireless link comprising a second MAC address, channel information, an operating class, security information, or a combination thereof, for the second wireless link.

27. The apparatus of claim 23, wherein the instructions to transmit the indication of the capability are executable by the processor to cause the apparatus to:

transmit the indication of the capability in one or both of a multi-band control field or a multi-band connection capability field.

28. The apparatus of claim 23, wherein the instructions to transmit the indication of the capability are executable by the processor to cause the apparatus to:

transmit the indication of the capability in a beacon, or an association request, or an association response, or a reassociation request, or a reassociation response, or a probe request, or a probe response, or an add block acknowledgement (ADDBA) request, or an ADDBA response, or a combination thereof.

29. An apparatus for wireless communication, comprising:

a processor, memory in electronic communication with the processor; and instructions stored in the memory and executable by the processor to cause the apparatus to:

receive, by a first wireless device, an indication of a capability of a second wireless device to transmit in parallel over a plurality of wireless links between the second wireless device and the first wireless device during at least a first duration of a multi-link session, the plurality of wireless links including at least a first wireless link and a second wireless link, the first wireless link identified by a first combination of a transmitter address (TA) and a receiver address (RA), and the second wireless link identified by a second combination of a TA and an RA, wherein the first combination is different than the second combination, wherein the indication further implies that a block acknowledgment (BA) session is for both the first wireless link and the second wireless link;

identify the first wireless link and the second wireless link of the plurality of wireless links based at least in part on the received indication of the capability;
establish, for the multi-link session, the first wireless link and the second wireless link between the first wireless device and the second wireless device based at least in part on the identification; and
receive, from the second wireless device, one or more BAs based at least in part on the BA session.

* * * * *